US009006592B2

(12) United States Patent
Taniguchi

(10) Patent No.: US 9,006,592 B2
(45) Date of Patent: Apr. 14, 2015

(54) ENTERTAINMENT BUTTON DEVICE AND GAME MACHINE

(75) Inventor: Masayuki Taniguchi, Nagoya (JP)

(73) Assignee: Kyoraku Industrial Co., Ltd., Nagoya-shi (JP)

( * ) Notice: Subject to any disclaimer, the term of this patent is extended or adjusted under 35 U.S.C. 154(b) by 317 days.

(21) Appl. No.: 13/599,140

(22) Filed: Aug. 30, 2012

(65) Prior Publication Data

US 2013/0143658 A1 Jun. 6, 2013

(30) Foreign Application Priority Data

Dec. 2, 2011 (JP) ................................ 2011-264293
Dec. 2, 2011 (JP) ................................ 2011-264294

(51) Int. Cl.

| | |
|---|---|
| ***H01H 13/00*** | (2006.01) |
| ***A63F 7/02*** | (2006.01) |
| ***H01H 13/52*** | (2006.01) |
| ***A63F 13/98*** | (2014.01) |
| ***A63F 13/20*** | (2014.01) |
| ***G07F 17/32*** | (2006.01) |

(52) U.S. Cl.
CPC ........... *A63F 7/022* (2013.01); *Y10T 74/18568* (2013.01); *Y10T 74/18664* (2013.01); *Y10T 74/18688* (2013.01); *H01H 13/52* (2013.01); *A63F 13/02* (2013.01); *A63F 13/06* (2013.01); *G07F 17/3209* (2013.01)

(58) Field of Classification Search
CPC ...................................................... H01H 13/52
USPC .......................... 200/16 B, 341, 523; 463/37
See application file for complete search history.

(56) References Cited

U.S. PATENT DOCUMENTS 6,437,270 B1 * 8/2002 Morrison et al. ............. 200/520
6,706,987 B1 * 3/2004 Yoo .............................. 200/529
8,608,547 B2 * 12/2013 Taniguchi et al. .............. 463/22

(Continued)

FOREIGN PATENT DOCUMENTS

JP 1-264123 A 10/1989
JP 2003-320114 11/2003

(Continued)

OTHER PUBLICATIONS

Japanese Notice of Reason for Rejection issued Nov. 15, 2012 in Patent Application No. 2011-264293 with English Translation.

(Continued)

*Primary Examiner* — Felix O Figueroa
(74) *Attorney, Agent, or Firm* — Oblon, McClelland, Maier & Neustadt, L.L.P.

(57) ABSTRACT

An entertainment button device includes: an entertainment button that a player can push; and a button-up-and-down mechanism configured to move the entertainment button up and down from a predetermined normal operation position to a protruding position in which the entertainment button protrudes upward from the normal operation position. The button-up-and-down mechanism includes: a bias member configured to bias the entertainment button in a moving-up direction; a shaft member extending in a moving direction of the entertainment button; a rotating mechanism configured to rotate the shaft member; an engagement part configured to move up and down together with the entertainment button; and a spiral guide part formed on an outer periphery of the shaft member in a spiral manner, wherein the engagement part engages with the spiral guide part.

5 Claims, 28 Drawing Sheets

(56) References Cited

U.S. PATENT DOCUMENTS

| | | | | |
|---|---|---|---|---|
| 8,690,676 | B2 * | 4/2014 | Taniguchi et al. | 463/37 |
| 8,708,338 | B2 * | 4/2014 | Taniguchi et al. | 273/121 B |
| 8,708,339 | B2 * | 4/2014 | Taniguchi et al. | 273/121 B |
| 8,758,134 | B2 * | 6/2014 | Taniguchi et al. | 463/37 |
| 8,785,794 | B2 * | 7/2014 | Taniguchi | 200/18 |
| 8,795,075 | B2 * | 8/2014 | Taniguchi et al. | 463/31 |
| 8,795,081 | B2 * | 8/2014 | Taniguchi et al. | 463/37 |
| 8,822,854 | B2 * | 9/2014 | Taniguchi | 200/18 |
| 2008/0025785 | A1 * | 1/2008 | Ma et al. | 401/87 |

FOREIGN PATENT DOCUMENTS

| | | | |
|---|---|---|---|
| JP | 2009-056085 | | 3/2009 |
| JP | 2011-87638 | A | 5/2011 |
| JP | 2011-130794 | A | 7/2011 |
| JP | 2011-130795 | A | 7/2011 |

OTHER PUBLICATIONS

Japanese Notice of Reason for Rejection issued Nov. 15, 2012 in Patent Application No. 2011-264294 with English Translation.

* cited by examiner

ENTERTAINMENT BUTTON DEVICE AND GAME MACHINE

CROSS-REFERENCES TO RELATED APPLICATIONS

This application claims the benefit of Japanese Patent Applications No. 2011-264293 filed Dec. 2, 2011 and No. 2011-264294 filed Dec. 2, 2011 which are incorporated herein by reference.

BACKGROUND

1. Technical Field

The present invention relates to an entertainment button device and a game machine, and more specifically to an entertainment button device having a button-up-and-down mechanism to move an entertainment button up and down, and a game machine including the entertainment button.

2. Related Art

Conventionally, a pachinko game machine includes a frame body in which a game board is set, and an opening and closing body. The opening and closing body is supported to be able to open and close by the frame body and includes a transparent plate that covers the board surface of the game board in the closed position. A tray unit having an accumulating tray to accumulate playing balls is provided below the opening and closing body (below the transparent plate). In recent years, mainstream pachinko game machines include an entertainment button device. This entertainment button device has an entertainment button that the player can push, and is set in a tray unit, as disclosed in, for example, Japanese Patent No. 3989287, and Japanese Patent Application Laid-Open No. 2009-56085. The entertainment button device has a spring that biases the entertainment button to the moving-up direction, and is generally configured to push the entertainment button from the upper side of the tray unit.

This entertainment button device has a configuration where the entertainment button is fitted into a bottom hole formed in the upper end of the tray unit to be able to move up and down. In the normal operation position, the entertainment button is held to protrude upward from the tray unit. When the entertainment button is pushed from the normal operation position to the pushed position, and then is released from being pushed, it returns to the normal operation position and held in this position. When the button is pushed during a period of time in which the button can be operated, the push operation is detected, and therefore a specific entertainment in the game is performed. This enhances the player's sense of participation and improves the effect of the entertainment in the game.

By the way, in the entertainment button device disclosed in U.S. Pat. No. 3,989,287, the entertainment button moves between the normal operation position and the pushed position. The position in which the entertainment button is held is alternately switched between the normal operation position and the pushed position. The entertainment button is set in a button case to be able to move up and down, and a spring that biases the entertainment button to the direction in which the entertainment button moves up is also set in the button case. A solenoid actuator (hereinafter referred to as "solenoid") moves the button case between a position in which the entertainment button is held in the normal operation position and a position in which the entertainment button is held in the pushed position.

Meanwhile, in the entertainment button device disclosed in 2009-56085, the entertainment button moves over the normal operation position, the pushed position and a protruding position in which the entertainment button protrudes much further than in the normal operation position. The position of the entertainment button is alternately switched between the normal operation position and the protruding position. A stopper plate is formed integrally with the entertainment button via a shaft, and a locking member is provided to be able to engage with the stopper plate. The locking member is engaged with the stopper plate by the solenoid to move between a position in which the entertainment button is held in the normal operation position and a position in which the entertainment button is held in the protruding position.

With the entertainment button device disclosed in U.S. Pat. No. 3,989,287, the button case is moved by the solenoid to allow the entertainment button to move between the normal operation position and the pushed position. Meanwhile, with the entertainment button disclosed in 2009-56085, the locking member is moved by the solenoid to allow the entertainment button to move between the normal operation position and the protruding position.

However, with the above-described related art, it is difficult to desirably move up and down the entertainment button, for example, the entertainment button is stopped temporarily at a predetermined position or moves up and down repeatedly, because the entertainment button is controlled through the solenoid to only move up and down between the two positions (between the normal operation position and the pushed position in U.S. Pat. No. 3,989,287; between the normal operation position and the protruding position in 2009-56085), which are the upper and lower limit positions to which the solenoid moves up and down. Also, it is difficult to freely change the speed at which the entertainment button moves up and down. That is, there is a limitation in improving the effect of the entertainment of a game by moving the entertainment button up and down.

Here, with a general entertainment button device, the entertainment button is small and has a short stroke of up-and-down movement. Therefore, even if the entertainment button moves up and down, the movement is less represented, and consequently is not much help to the improvement of the effect of the entertainment in a game. To solve this drawback, an approach is proposed to increase the size of the entertainment button to lengthen the stroke of up-and-down movement. However, a large solenoid is required to lengthen the stroke of the up-and-down movement. With such a large solenoid, the entertainment button is not likely to smoothly move between the above-described two positions. Moreover, there is another problem of the arrangement and the installation of the solenoid. The above-described problem in the control of the entertainment button to move up and down by the solenoid still remains.

SUMMARY

It is therefore, an object of the present invention to provide an entertainment button device and a game machine. The entertainment button device has a button-up-and-down mechanism to move an entertainment button up and down. This mechanism allows the entertainment button to smoothly and desirably move up and down, and can freely change the speed of up-and-down movement of the entertainment button.

According to a first aspect of the present invention, an entertainment button device includes: an entertainment button that a player can push; and a button-up-and-down mechanism configured to move the entertainment button up and down from a predetermined normal operation position to a protruding position in which the entertainment button protrudes upward from the normal operation position. The button-up-and-down mechanism includes: a bias member configured to bias the entertainment button in a moving-up direction; a shaft member extending in a moving direction of the entertainment button; a rotating mechanism configured to rotate the shaft member; an engagement part configured to move up and down together with the entertainment button; and a spiral guide part formed on an outer periphery of the shaft member in a spiral manner. The engagement part engages with the spiral guide part. The rotating mechanism rotates the shaft member, and therefore the spiral guide part moves the engagement part in a moving direction, so that the entertainment button moves up and down between the predetermined normal operation position to the protruding position.

According to a second aspect of the present invention, the shaft member is provided inside the entertainment button; an annular member is provided in the entertainment button and located outside the outer periphery of the shaft member; and the engagement part is provided on an inner periphery of the annular member to protrude to the shaft member, wherein the engagement part can engage with the spiral guide part.

According to a third aspect of the present invention, the spiral guide part includes a first spiral guide portion and a second spiral guide portion, wherein the second spiral guide portion continues to an front end of the first spiral guide portion and has a greater angle of inclination than of the first spiral guide portion.

According to a fourth aspect of the present invention, the entertainment button device further includes a smoothing guide part continuing to a base end of the spiral guide part and extending in parallel with a plane orthogonal to a central axis of the shaft member. The engagement part engages with the smoothing guide part to hold the entertainment button in the normal operation position.

According to a fifth aspect of the present invention, a game machine having the entertainment button device is provided.

With the entertainment button device and the game machine according to the present invention, it is possible to smoothly move the entertainment button up and down by means of the button-up-and-down mechanism, and therefore improve the effect of the entertainment in a game.

DESCRIPTION OF EXEMPLARY EMBODIMENTS

Now, a plurality of aspects of the present invention will be explained according to an embodiment.

Embodiment

Figure 1:
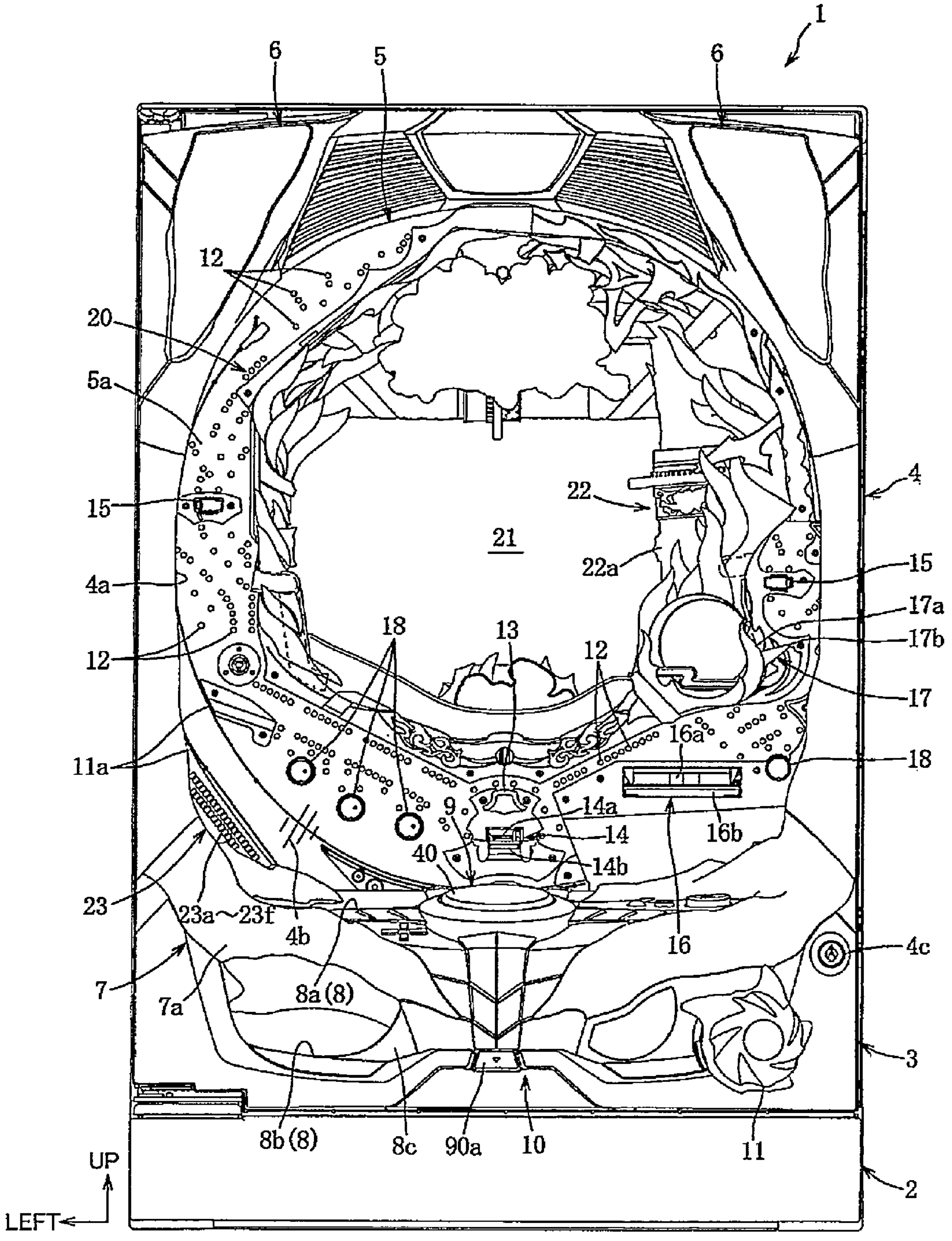
FIG. 1 is an exemplary front view showing a pachinko game machine according to an embodiment.

As shown in FIG. 1, a pachinko game machine 1 includes an outer frame 2, an opening and closing frame 3 (inner frame 3) and a door 4. The outer frame 2 is attached to a game machine array structure in a pachinko game parlor. The opening and closing frame 3 is mounted to the outer frame 2 to be able to open and close, and the door 4 is mounted to the opening and closing frame 3 to be able to open and close. A window **4*a* is formed in the door 4, and a transparent plate 4*b* is put in the window 4*a*. A game board 5 having a board surface in which playing balls are launched, is set in the opening and closing frame 3. A playfield 5*a* is formed between the board surface of the game board 5 and the transparent plate 4*b* in front of the game board 5*a*. The playfield 5*a* allows playing balls to cascade down. Here, the outer frame 2 and the opening and closing frame 3 serve, or only the opening and closing frame 3 serves as a frame part, and the door 4** serves as an opening and closing part.

The left end of the opening and closing frame 3 is supported at the left end of the outer frame 2 to be able to revolve around the vertical axis. The opening and closing frame 3 is locked to the outer frame 2 in a closed position. The left end of the door 4 is supported at the left end of the opening and closing frame 3 to be able to revolve around the vertical axis. The door 4 is locked to the opening and closing frame 3 in a closed position in which the door 4 overlaps the opening and closing frame 3 to cover the board surface (playfield 5*a*) of the game board 5. A key cylinder 4*c* is provided in the lower right of the door 4. The key cylinder 4*c* is operated by a key to release the opening and closing frame 3 from being locked to the outer frame 2, and also release the door 4 from being locked to the opening and closing frame 3.

A pair of left and right light emitting devices 6 (movable entertainment devices 6) is provided in the upper part of the door 4. A tray unit 7 having an accumulating tray 8 (an upper tray 8*a* and a lower tray 8*b*) that accumulates playing balls, is provided in the lower part of the door 4 (the lower part of the window 4*a*). An entertainment button device 9 and a discharge device 10 are set in the tray unit 7. The entertainment button device 9 includes an entertainment button 40 that the player can push. The discharge device 10 discharges the playing balls accumulated in the lower tray 8*b* to the outside of the game machine 1.

A launching handle 11 is provided in the lower right of the tray unit 7. When the launching handle 11 is rotated, a launching device (not shown) launches a playing ball introduced by a ball feeding device (not shown) from the upper tray 8*a* to a launching position. When a plurality of playing balls are accumulated in the upper tray 8*a*, the plurality of playing balls are launched consecutively every approximately 0.6 seconds. The launched playing balls are guided through a guide rail 11*a* and introduced into the upper part of the playfield 5*a*.

Figure 2:
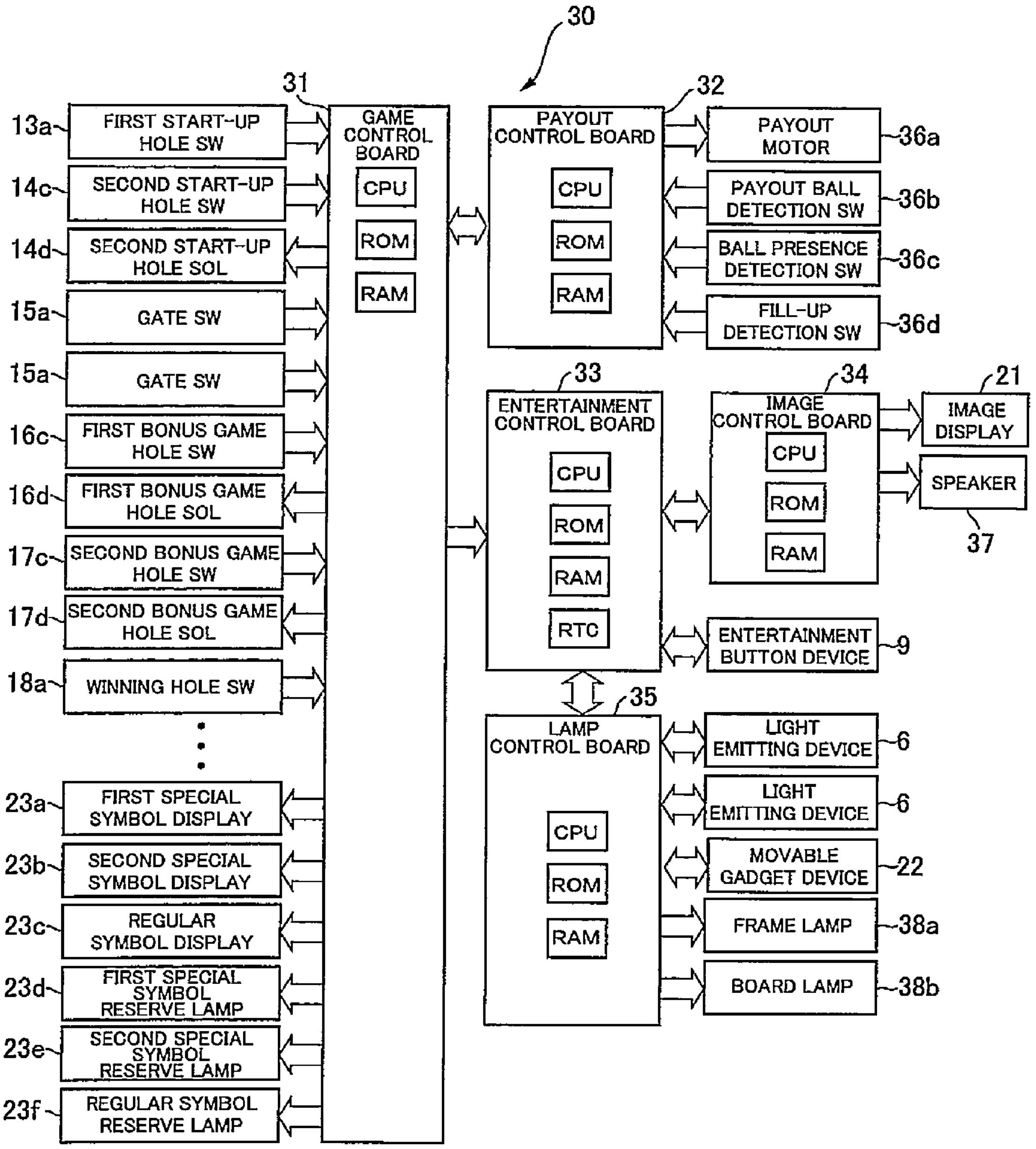
FIG. 2 is an exemplary block diagram showing a control system of the pachinko game machine.

As shown in FIG. 1 and FIG. 2, in the playfield 5*a* of the game board 5, a first start-up hole 13, a second start-up hole device 14 having an openable second start-up hole 14*a*, a pair of gates 15, a first bonus game hole device 16 having an openable first bonus game hole 16*a*, a second bonus game hole device 17 having an openable second bonus game hole 17*a*, and a plurality of (e.g. four) winning holes 18, as well as a number of pegs 12, are arranged so that playing balls can enter or pass through.

The first start-up hole 13, the pair of gates 15 and the plurality of winning holes 18 are provided with a first start-up hole SW 13*a* (here "SW" refers to "switch"), a pair of gate SWs 15*a* and a plurality of winning hole SWs 18*a*, respectively, to detect the playing balls entering these hole and gates. The second start-up hole device 14 has a second start-up hole 14*a*, an opening and closing member 14*b* that opens and closes the second start-up hole 14*a*, a second start-up hole SW 14*c* that detects a playing ball entering the second start-up hole 14*a*, and a second start-up hole SOL 14*d* ("SOL" refers to "solenoid actuator") that allows the opening and closing member 14*b* to open and close.

The first and second bonus game hole devices 16 and 17 have: first and second bonus game holes 16*a* and 17*a*; first and second opening and closing members 16*b* and 17*b* that open and close the first and second bonus game holes 16*a* and 17*a*; first and second bonus game hole SWs 16*c* and 17*c* that detect playing balls entering the first and second bonus game holes 16*a* and 17*a*; and first and second bonus game hole SOLs 16*d* and 17*d* that allow the first and second opening and closing members 16*b* and 17*b* to open and close, respectively. The number of balls to be paid out for a case in which one playing ball enters a hole is preset for each of the holes 13, 14*a*, 16*a*, 17*a* and 18. When a playing ball enters any of the holes 13, 14*a*, 16*a*, 17*a* and 18, the playing balls in the number which is set for the hole, are paid out to the accumulating tray 8.

At the time a playing ball enters one of the start-up holes 13 and 14*a*, a bonus game lottery is started. When the player wins the bonus game lottery, one of the first and second bonus game hole devices 16 and 17 activates and starts a bonus game to open one of the first and second bonus game holes 16*a* and 17*a* which are closed in general. At the time a playing ball passes through one of the pair of gates 15, a lottery is started. When the player wins the lottery, the second start-up hole device 14 activates and starts a supplementary game to open the second start-up hole 14*a* which is closed in general.

A center gadget 20 is set in the game board 5. This center gadget 20 is provided with an image display 21 and a movable gadget device 22. The screen of the image display 21 is arranged to appear in the frame of the center gadget device 20. The entertainment representing a bonus game lottery and so forth are shown on the image display 21. The movable gadget device 22 activates to inform about a bonus game lottery (for example, inform a high possibility of winning a bonus game lottery). For example, the movable gadget device 22 moves the movable gadget 22*a* in the direction parallel to the board surface of the game board 5 in a position near the screen of the image display 21.

A game display board 23 is provided in the lower left of the game board 5. A first special symbol display 23*a*, a second special symbol display 23*b*, a regular symbol display 23*c*, a first special symbol reserve lamp 23*d*, a second special symbol reserve lamp 23*e* and a regular symbol reserve lamp 23*f* are provided on the game display board 23.

A first special symbol is variably displayed on the first special symbol display 23*a* and a first special symbol reserve number is displayed on the first special symbol reserve lamp 23*d*. When the first special symbol reserve number is smaller than four, it is incremented by one every time a playing ball enters the first start-up hole 13. A second special symbol is variably displayed on the second special symbol display 23*b*, and a second special symbol reserve number is displayed on the second special symbol reserve lamp 23*e*. When the second special symbol reserve number is smaller than four, it is incremented by one every time a playing ball enters the second start-up hole 14*a*.

When the first special symbol reserve number is more than one and the second special symbol reserve number is zero while the first special symbol and the second special symbol stop, the first special symbol reserve number is decremented by one, and therefore the first special symbol starts changing. Then, when the first special symbol stops, the result of the bonus game lottery is represented by the stopped first special symbol. When the second special symbol reserve number is more than one while the first and second special symbols stop, the second special symbol reserve number is decremented by one regardless of the first special symbol reserve number, and therefore the second special symbol starts changing. Then, when the second special symbol stops, the result of the bonus game lottery is represented by the stopped second special symbol.

A regular symbol is variably displayed on the regular symbol display 23*c*, and a regular symbol reserve number is displayed on the regular symbol reserve lamp 23*f*. When the regular symbol reserve number is smaller than four, the regular symbol reserve number is incremented by one every time a playing ball passes through the gate 15. When the regular symbol reserve number is more than one while the regular symbol stops, the regular symbol reserve number is decremented by one, and therefore the regular symbol starts changing. Then, when the regular symbol stops, the result of the lottery is represented by the stopped regular symbol.

As shown in FIG. 2, a control device 30 of the pachinko game machine 1 has a game control board 31, a payout control board 32, an entertainment control board 33, an image control board 34, and a lamp control board 35. Each of these control boards 31 to 35 has a computer including a CPU, a ROM and a RAM. The entertainment control board 33 further includes an RTC ("RTC" means "real time clock").

The computer for the game control board 31 controls the start-up hole SOL 14*d*, the bonus game hole SOLs 16*d* and 17*d*, the symbol displays 23*a* to 23*c* and the symbol reserve lamps 23*d* to 23*f* in response to detection signals from the start-up hole SWs 13*a* and 14*c*, the gate SW 15*a*, the bonus game hole SWs 16*c* and 17*c* and the winning hole SW 18*a*, and the control information from the payout control board 32, and outputs control information to the payout control board 32 and the entertainment control board 33.

The computer for the payout control board 32 controls a payout motor 36*a* of the payout device in response to the control information from the game control board 31 and the detection signals from a payout ball detection SW 36*b*, a ball presence detection SW 36*c* and a fill-up detection SW 36*d*, and outputs control information to the game control board 31. The computer for the entertainment control board 33 controls the entertainment button device 9 in response to the control information from the game control board 31, the image control board 34 and the lamp control board 35, and the detection signal from the entertainment button device 9, and outputs control information to the image control board 34 and the lamp control board 35.

The computer for the image control board 34 controls the image display 21 and a speaker 37 in response to the control information from the entertainment control board 33, and outputs the control information to the entertainment control board 33. The computer for the lamp control board 35 controls the pair of light emitting devices 6, the movable gadget device 22, a frame lamp 38*a* and a board lamp 38*b* in response to the control information from the entertainment control board 23 and the detection signals from the pair of light emitting devices 6 and the movable gadget device 22, and outputs control information to the entertainment control board 33.

The respective computers for the entertainment control board 33, the image control board 34 and the lamp control board control the image display 21, the speaker 37, the entertainment button device 9, the pair of light emitting devices 6, the movable gadget device 22, the frame lamp 38*a* and the board lamp 38*b* which are entertainment equipment. The equipment makes entertainment along the progression of a game using playing balls.

Next, the tray unit 7, and the entertainment button device 9 and the discharge device 10 set in the tray unit 7, will be described in detail.

First, the tray unit 7 will be described. As shown in FIG. 1 and FIGS. 3 to 10, the tray unit 7 has a thickness in the vertical direction, which is approximately the same as the height of the lower part of the door 4 (the portion below the window 4*a*). The tray unit 7 is formed to bulge forward from the lower part of the door 4, which looks like a mountain in a plan view. The tray unit 7 includes a unit main body 7*a* as its external form, which is made of synthetic resin. The upper tray 8*a* is formed in the upper part of the unit main body 7*a*, and the lower tray 8*b* is formed in the lower left of the unit main body 7*a*. A playing ball paid out from the payout device mounted to the opening and closing frame 3 is introduced through a payout passage (not shown) provided in the opening and closing frame 3, into the upper tray 8*a* and accumulated. When the upper tray 8*a* is filled with playing balls, the playing balls are introduced into the lower tray 8*b* and accumulated.

The length of the upper tray 8*a* in the longitudinal direction is reduced from a position near the center of the upper tray 8*a* such that the front wall of the upper tray 8*a* in the right side is placed in the back rather than in the left side. The main bottom part of the upper tray 8*a* gently tilts down to the right, and therefore playing balls are introduced from the right end part of the upper tray 8*a* into the ball feeding device. The front wall of the lower tray 8*b* bulges forward in the right side rather than in the left side, and the bottom part of the lower tray 8*b* gently tilts forward and to the right. Playing balls are introduced from the front right part of the lower tray 8*b* into the discharge device 10, drop down to the bottom part of the discharge device 10 and are discharged to the outside of the game machine 1. A ball accommodating case (not shown), so-called "gold mine" is placed below the discharge device 10. The playing balls discharged from the discharge device 10 are received by and accommodated in the ball accommodating case.

The playing balls accumulated in the lower tray 8*b* may not be discharged from the discharge device 10 to the outside but supplied to the upper tray 8*a*. In this case, the playing balls accumulated in the lower tray 8*b* are taken out with the left hand while the player grips the launching handle 11 with the right hand. At this time, the playing balls are likely to run over from the upper right of the lower tray 8*b* due to the shape of the front wall of the lower tray 8*b*, the manner of taking out the playing balls by the player and so forth. Therefore, in order to prevent this, a transparent plate 8*c* (see FIG. 1) made of synthetic resin is provided as a partition wall from the outside of the upper right part of the lower tray 8*b*.

This transparent plate 8*c* bends to protrude forward a little, and also the upper edge of the transparent plate 8*c* curves such that the slope angle of the upper edge increases to the right to increase the height of the transparent plate 8*c* to the right. The bottom edge of the transparent plate 8*c* is fixed to the front wall of the lower tray 8*b*. The right edge of the transparent plate 8*c* is fixed to the part of the unit main body 7*a*, which is the right wall of the space above the lower tray 8*b*. The player can see and check the playing balls located behind the transparent plate 8*c*, and the transparent plate 8*c* has the upper edge with the shape which does not interfere with the left hand taking out the playing balls. Thus, the transparent plate 8*c* allows the player to reliably take out playing balls from the lower tray 8*b* without dropping playing balls.

Figure 12:
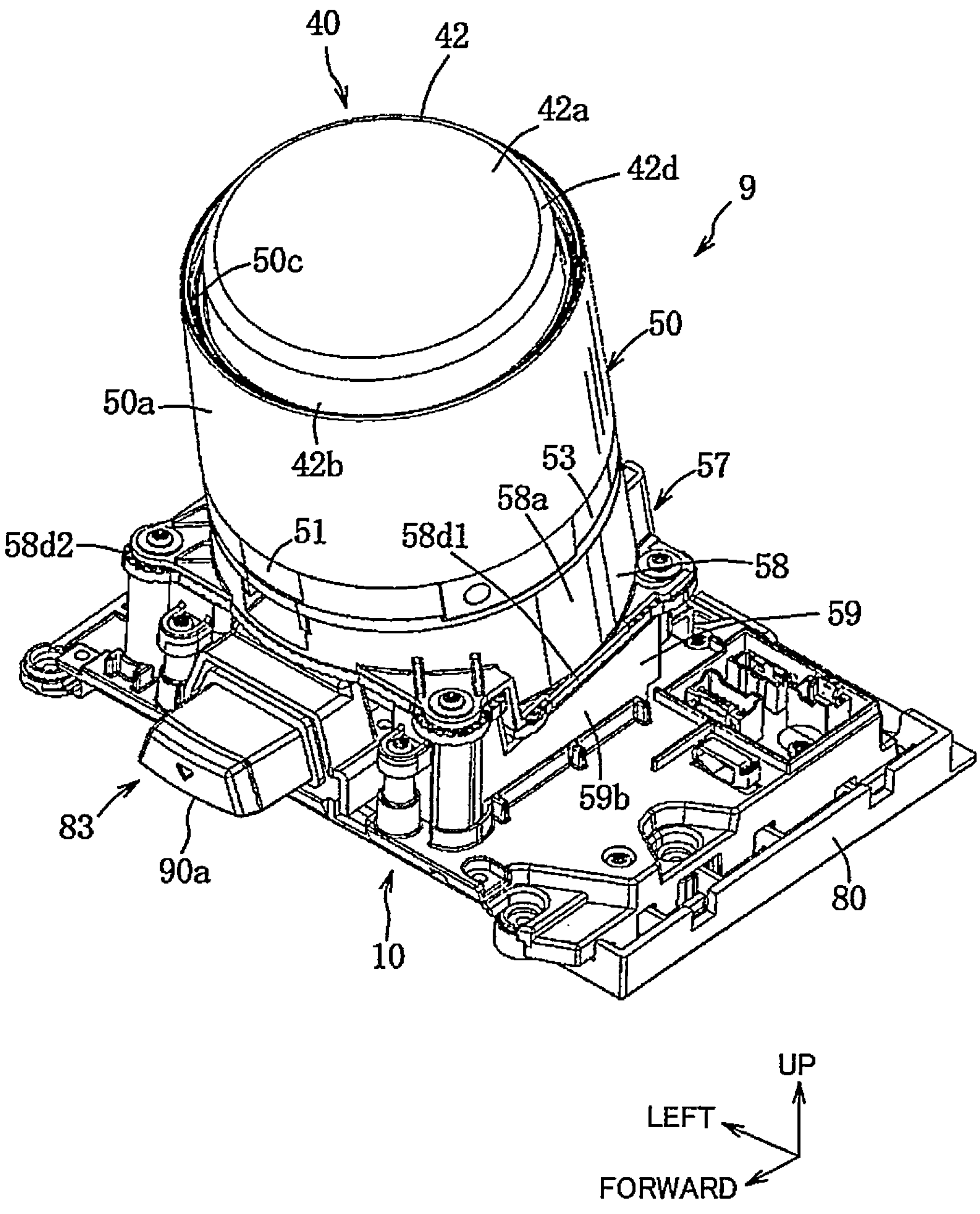
FIG. 12 is an exemplary perspective view showing the entertainment button device, a base and a discharge device.
Figure 13:
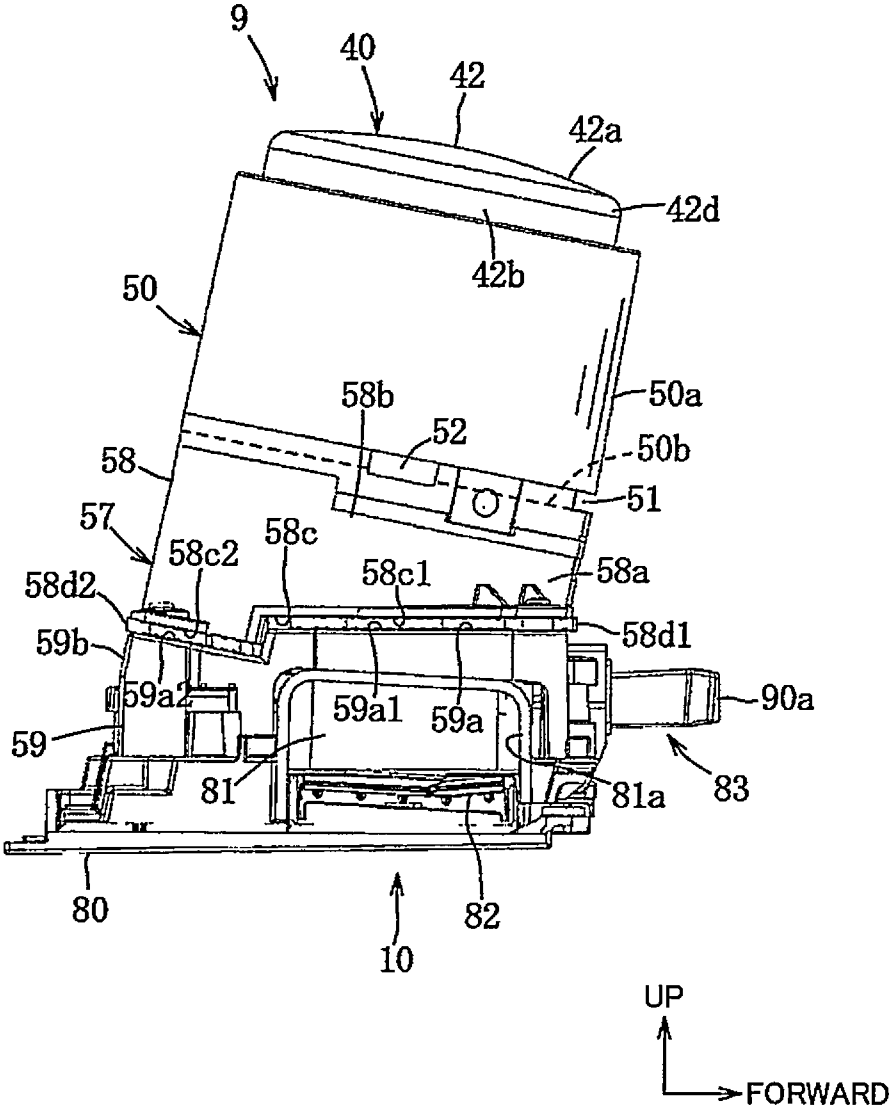
FIG. 13 is an exemplary left side view showing the entertainment button device, the base and the discharge device.
Figure 14:
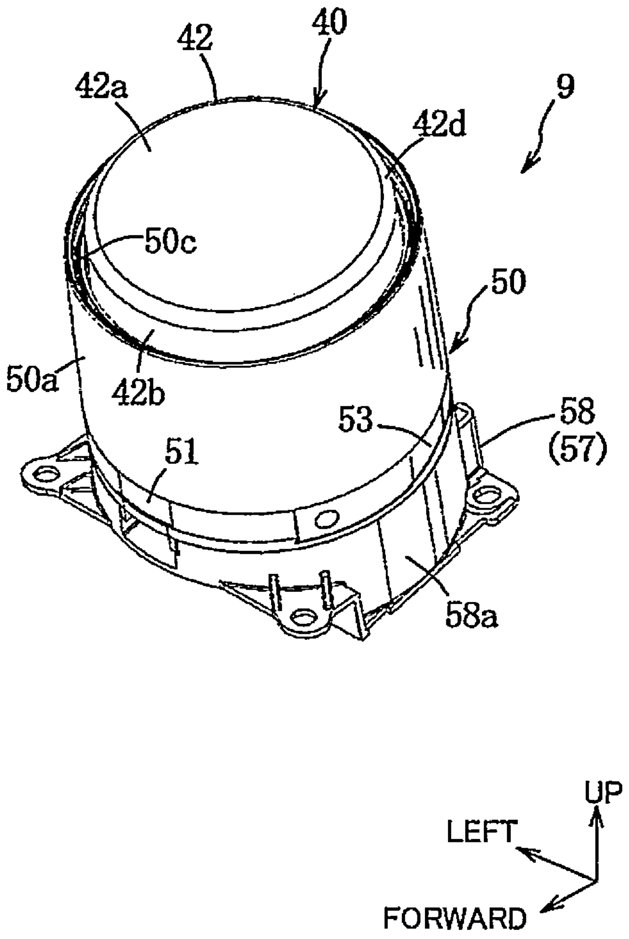
FIG. 14 is an exemplary perspective view showing the entertainment button device and an upper base.
Figure 15:
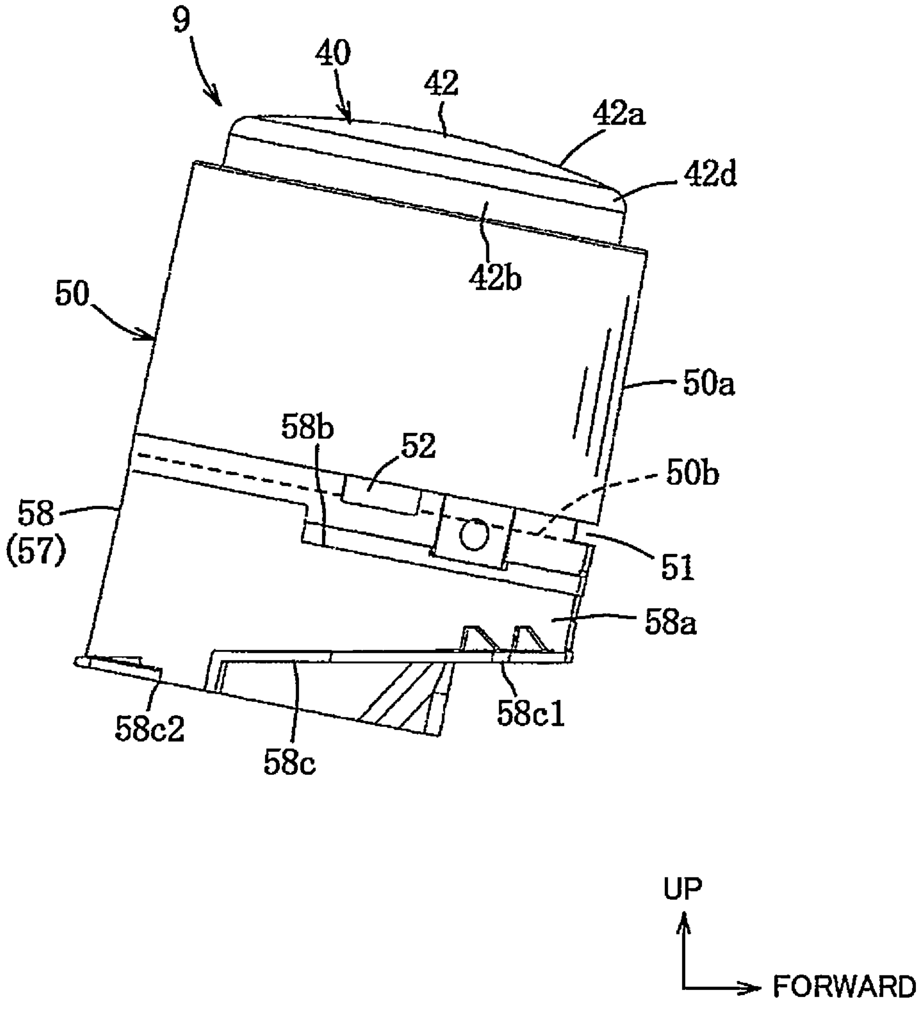
FIG. 15 is an exemplary left side view showing the entertainment button device and the upper base.
Figure 16:
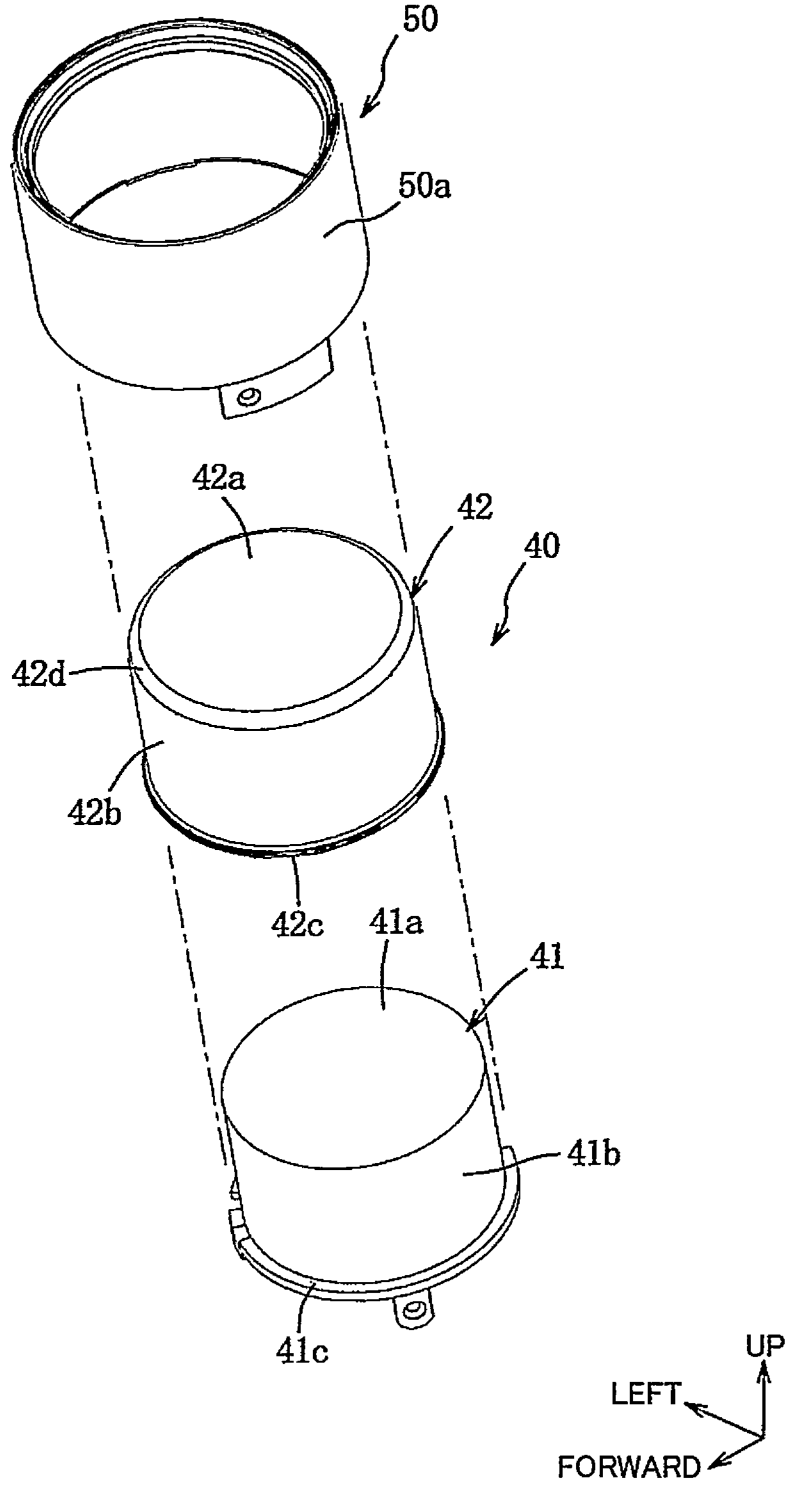
FIG. 16 is an exemplary exploded perspective view showing a button body, a button cover and the side wall of a button case.
Figure 17:
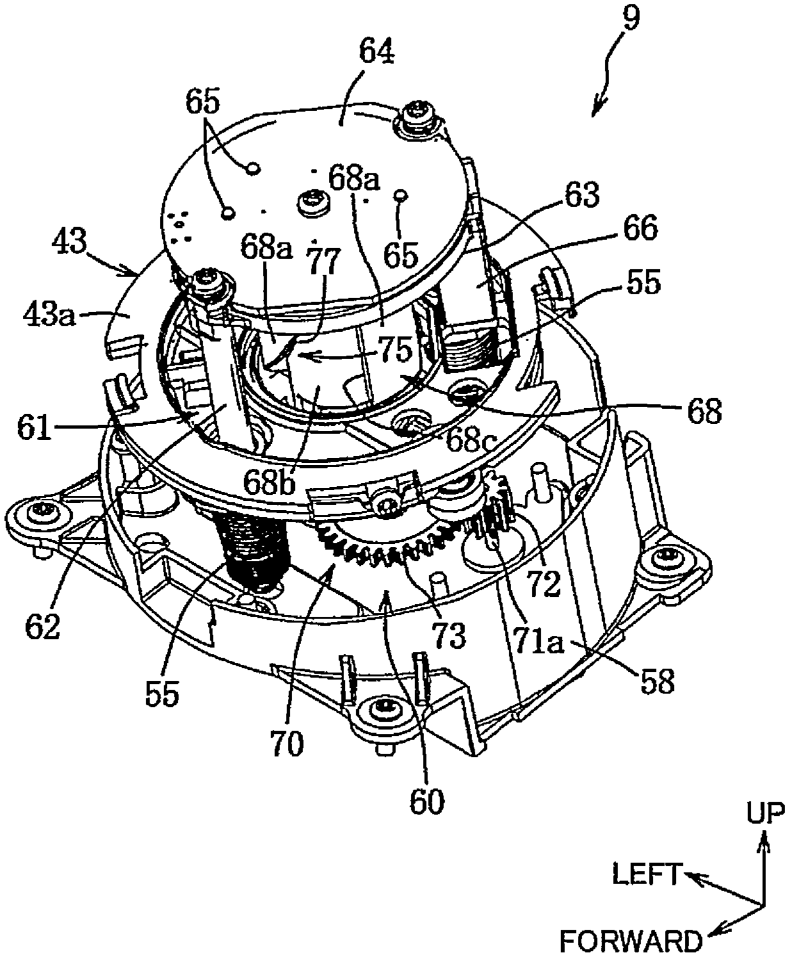
FIG. 17 is an exemplary perspective view showing the entertainment button device without parts such as the entertainment button, button case and so forth, and also showing main parts of the upper base.
Figure 18:
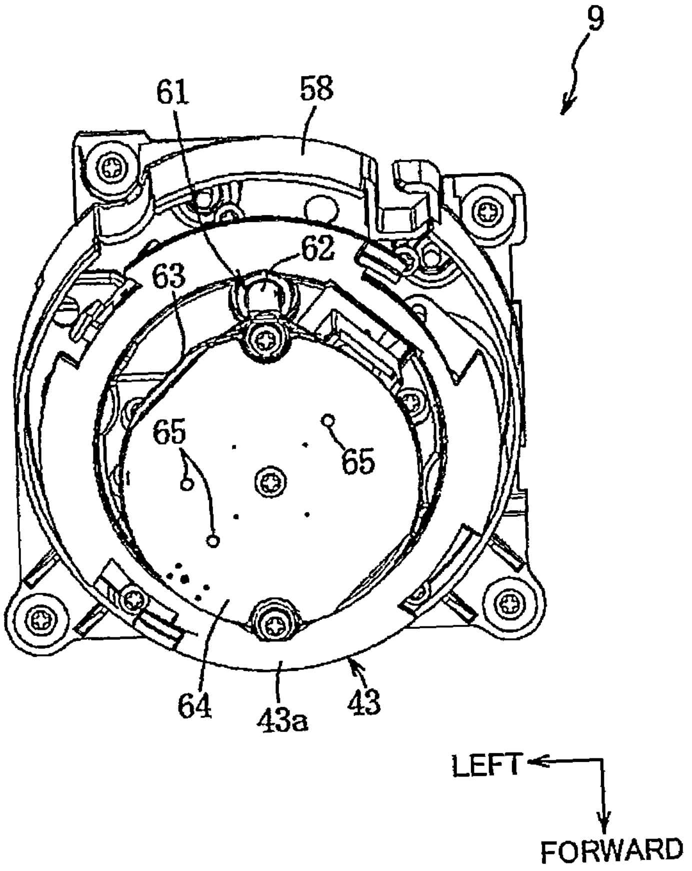
FIG. 18 is an exemplary plan view showing the entertainment button device and the main parts of the upper base.
Figure 19:
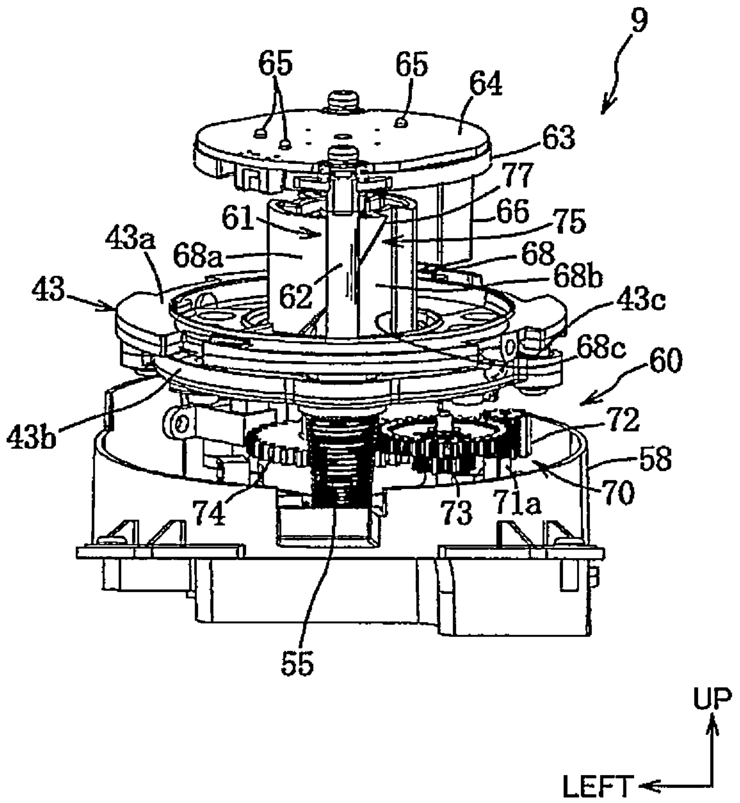
FIG. 19 is an exemplary front view showing the entertainment button device and the main parts of the upper base.
Figure 20:
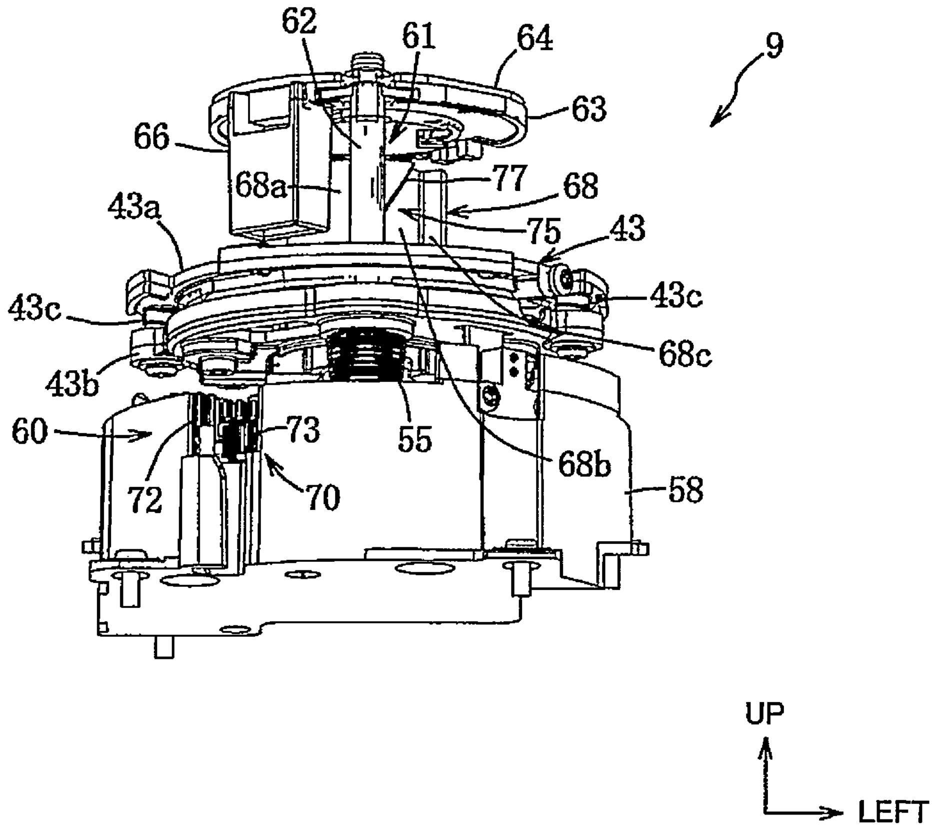
FIG. 20 is an exemplary rear view showing the entertainment button device and the main parts of the upper base.
Figure 21:
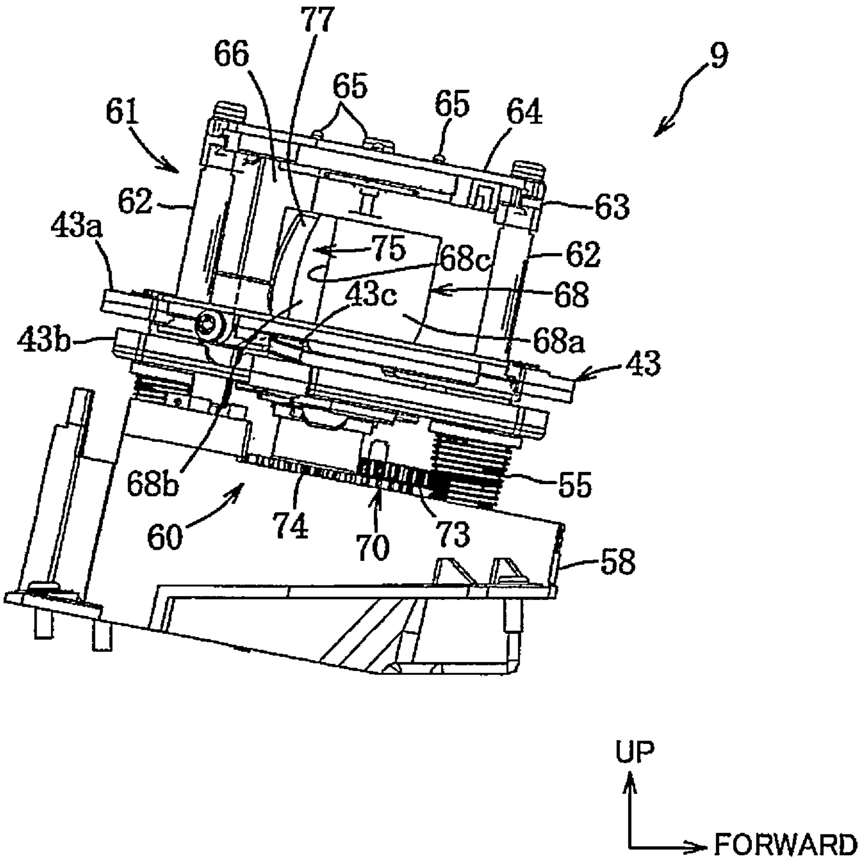
FIG. 21 is an exemplary left side view showing the entertainment button device and the main parts of the upper base.

The entertainment button device 9 and the discharge device 10 are set in the central part of the tray unit 7. The entertainment button device 9 is arranged such that the entertainment button 40 can be pushed from the upper side of the tray unit 7. The discharge device 10 is arranged in the lower end of the tray unit 7 to be located on the right side of the lower tray 8*b* and below the entertainment button device 9. The discharge device 10 is fixed to a device mounting frame part 7*b* (see FIGS. 8 to 11) which is formed in the lower end of the tray unit 7 (unit main body 7*a*). The entertainment button device 9 is placed on and fixedly supported by the discharge device 10 (see FIG. 12 and FIG. 13).

As shown in FIGS. 3 to 7, in order to set the entertainment button device 9 and the discharge device 10 in the tray unit 7, a button hole 7*c* is formed in the upper end of the unit main body 7*a*. In addition, a device accommodating hole 7*d* including the button hole 7*c* is formed to vertically penetrate the unit main body 7*a*, and the device mounting frame part 7*b* is formed near the outer circumference of the lower end of the device accommodating hole 7*d*. Part of the rear of the upper peripheral wall 7*c*1 of the button hole 7*c* in the unit main body 7*a* is formed by the front wall in the middle of the upper tray 8*a*, where the length of the upper tray 8*a* in the longitudinal direction changes.

As shown in FIGS. 8 to 11, a reinforcing metal plate 39 shaped like a gate in a plan view, which opens outward, is attached to the device mounting frame part 7*b*. The discharge device 10 is fixed to the device mounting frame part 7*b* of the unit main body 7*a* via the reinforcing metal plate 39. A pair of plate support portions 7*b*1 and 7*b*2 extending in the longitudinal direction is formed in the left and right sides of the device mounting frame part 7*b*. A pair of left and right plate pieces 39*a* and 39*b* extending in the longitudinal direction, which is part of the reinforcing metal plate 39, is placed on and attached to the pair of plate support portions 7*b*1 and 7*b*2, respectively, contacting face-to-face. A plurality of (five) nut members 39*c* are fixed to the reinforcing metal plate 39 to protrude downward. The discharge device 10 is attached to the reinforcing metal plate 39 by being fastened with a plurality of (five) bolts (not shown) screwed into the plurality of nut member 39*c*.

Here, another configuration is possible where a plurality of reinforcing metal plates are provided instead of the reinforcing metal plate 39, and the discharge device 10 is fixed to the device mounting frame part 7*b* of the unit main body 7*a* via the plurality of reinforcing metal plates. In this case, at least one of the plurality of reinforcing metal plates (for example, a pair of reinforcing plates corresponding to a left plate piece 39*a* and a right plate piece 39*b*) may be placed on and attached to the plate support portions (for example, the pair of plate support portions 7*b*1 and 7*b*2) formed in the device mounting frame part 7*b*, contacting face-to-face.

Figure 3:
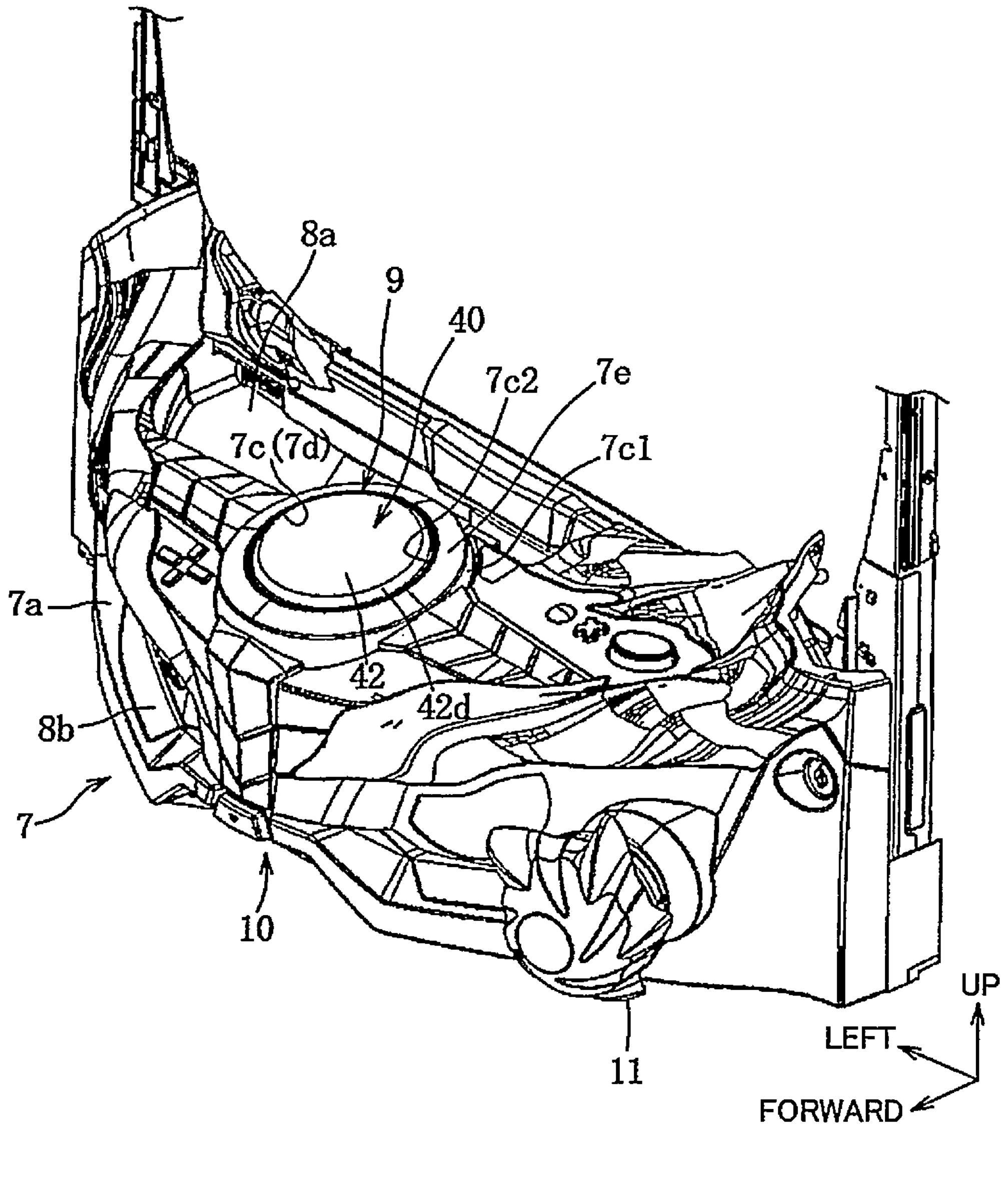
FIG. 3 is an exemplary perspective view showing a tray unit in a state in which an entertainment button is in a normal operation position.
Figure 4:
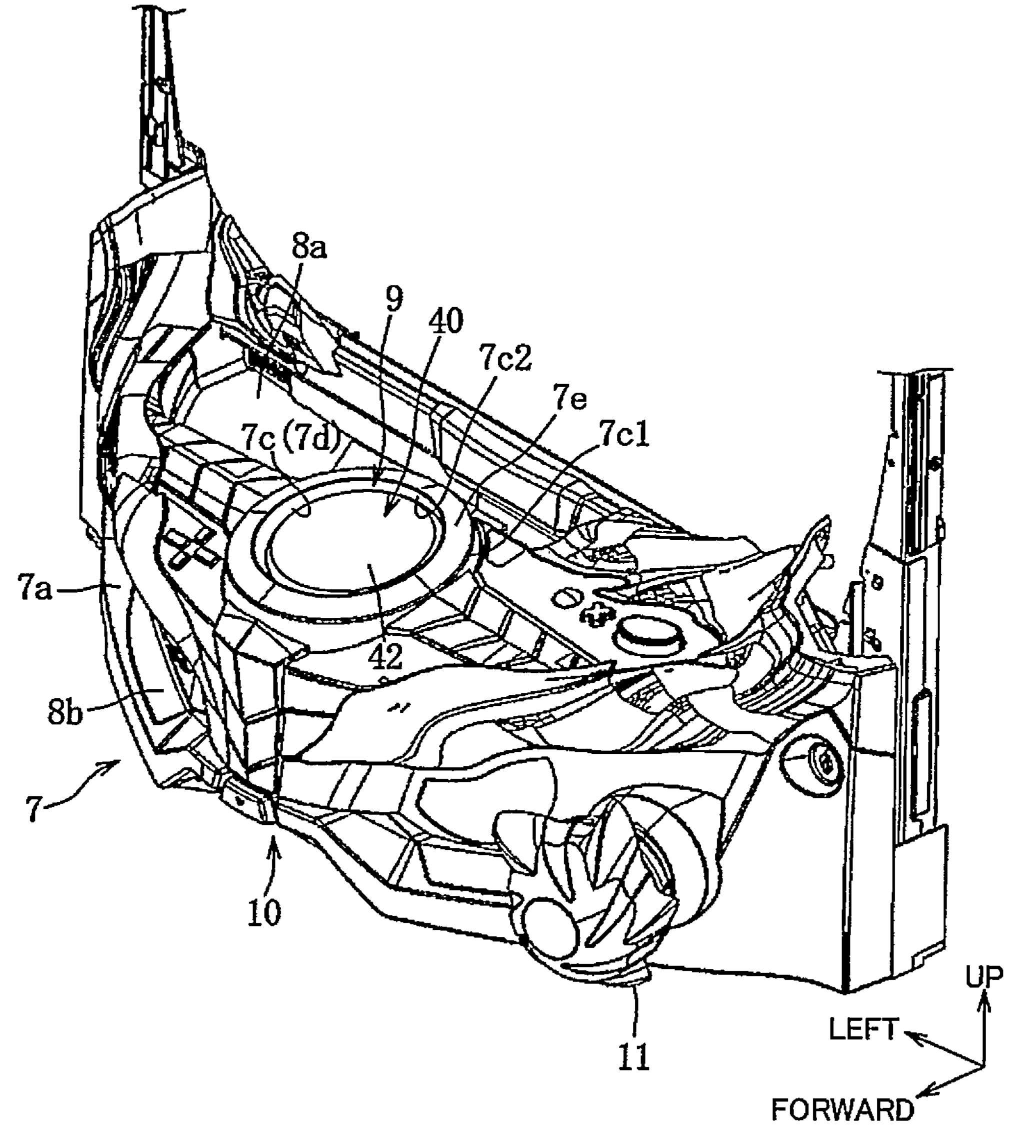
FIG. 4 is an exemplary perspective view showing the tray unit in a state in which the entertainment button is in a pushed position.
Figure 5:
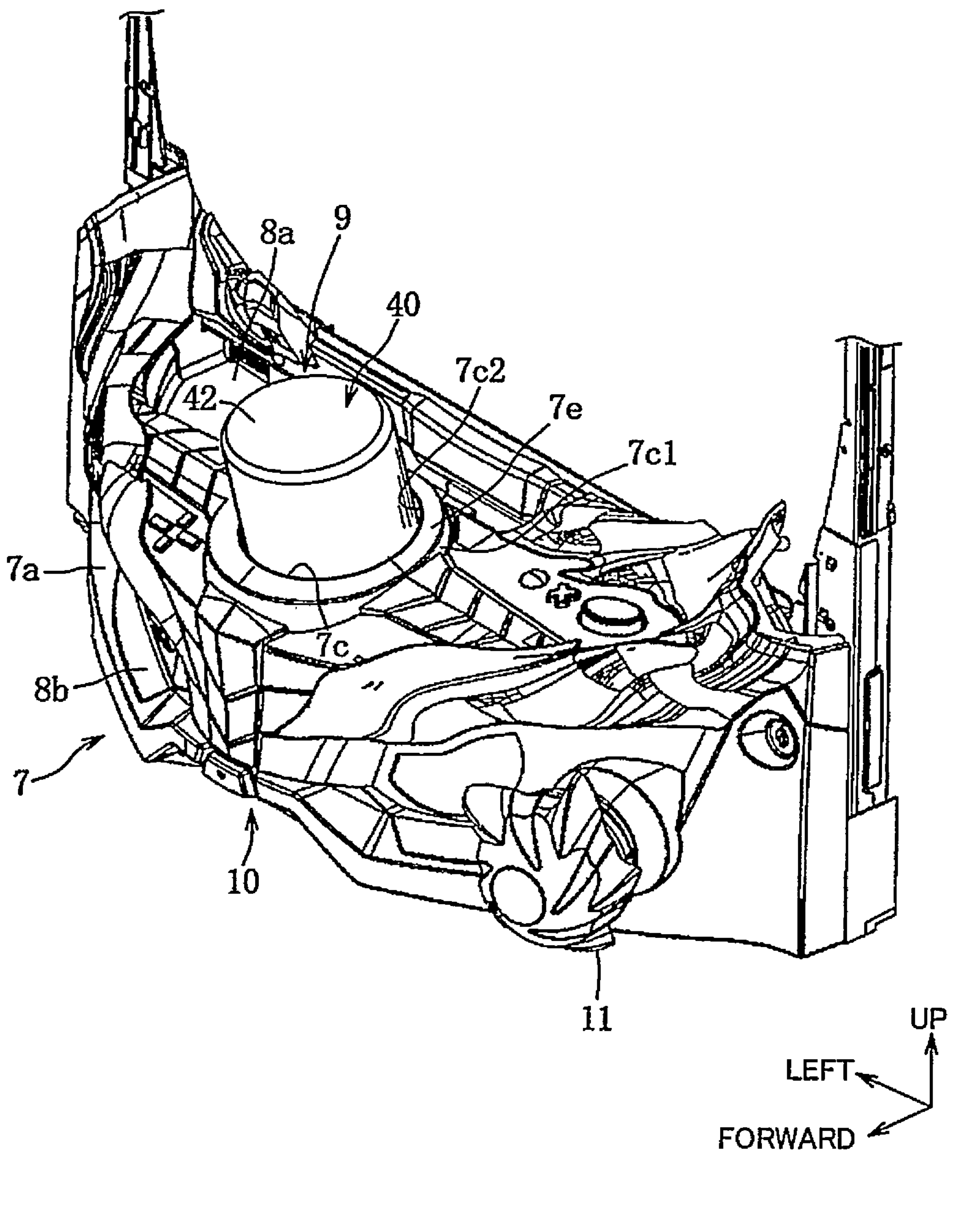
FIG. 5 is an exemplary perspective view showing the tray unit in a state in which the entertainment button is in a protruding position.
Figure 6:
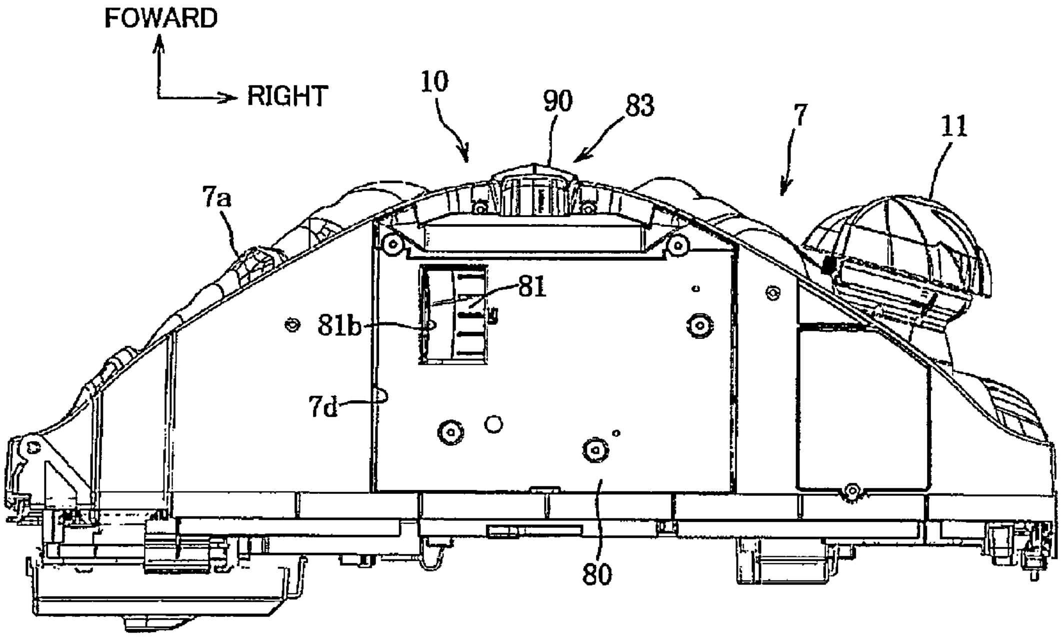
FIG. 6 is an exemplary bottom view showing the tray unit.
Figure 7:
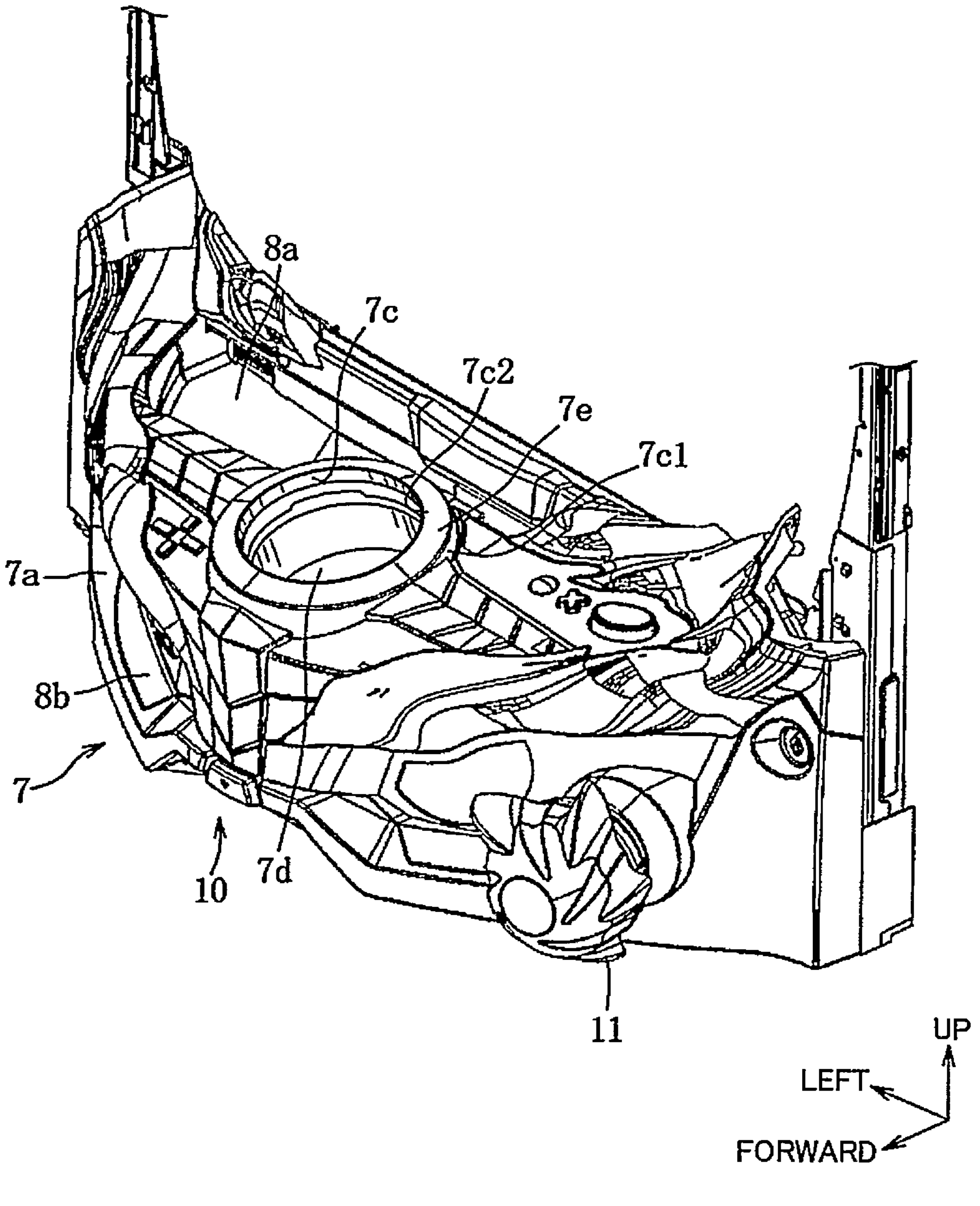
FIG. 7 is an exemplary perspective view showing the tray unit without an entertainment button device.
Figure 8:
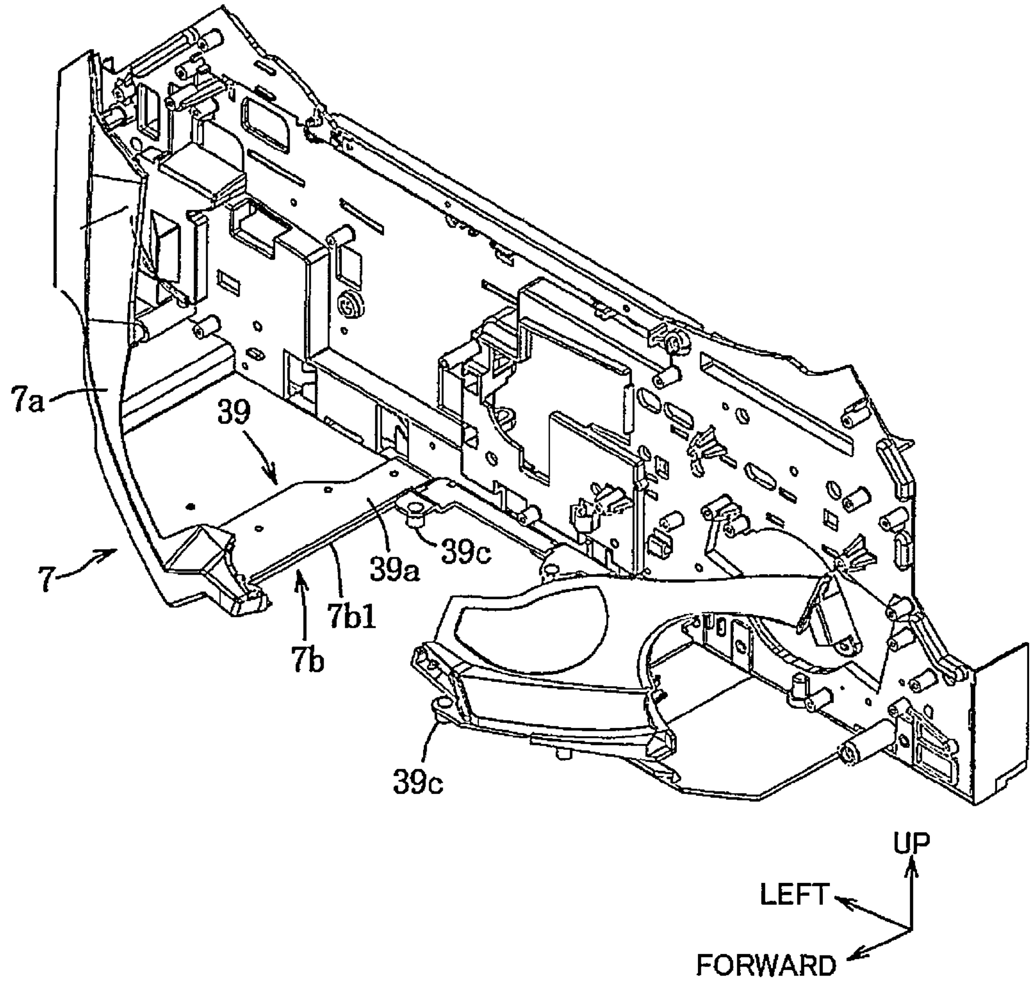
FIG. 8 is an exemplary perspective view showing part of the unit main body of the tray unit.
Figure 9:
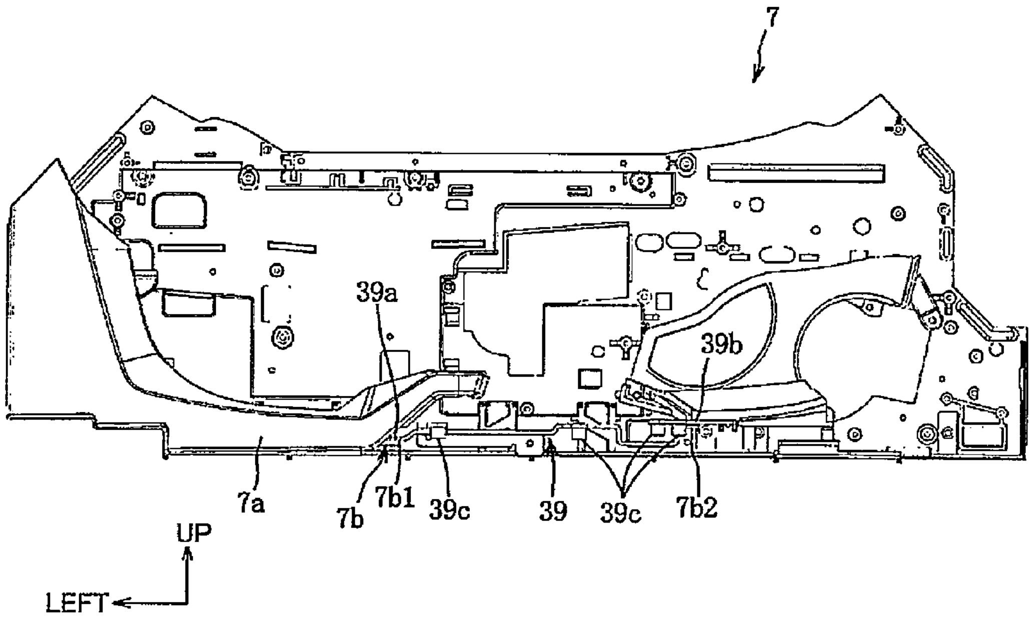
FIG. 9 is an exemplary front view showing part of the unit main body.
Figure 10:
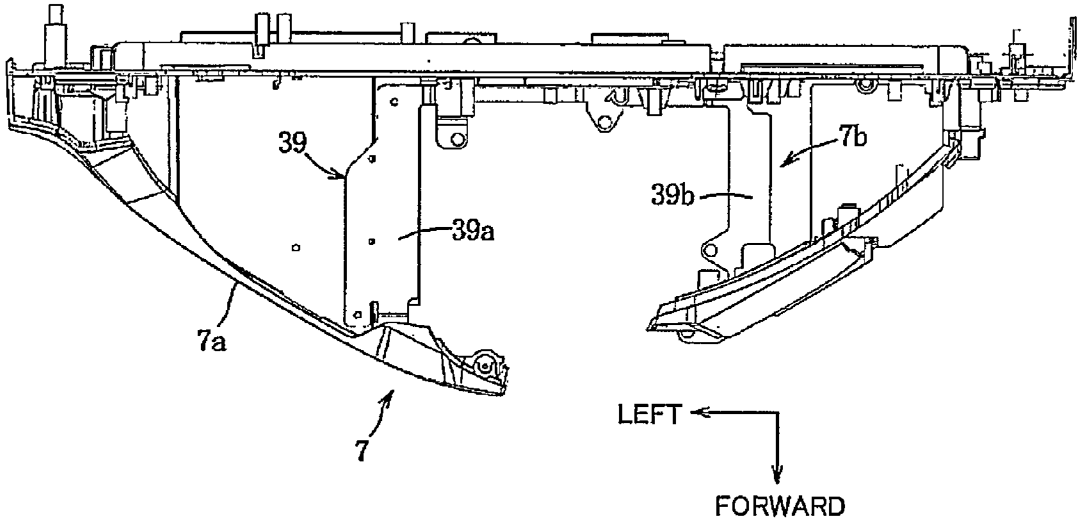
FIG. 10 is an exemplary plan view showing part of the unit main body.
Figure 11:
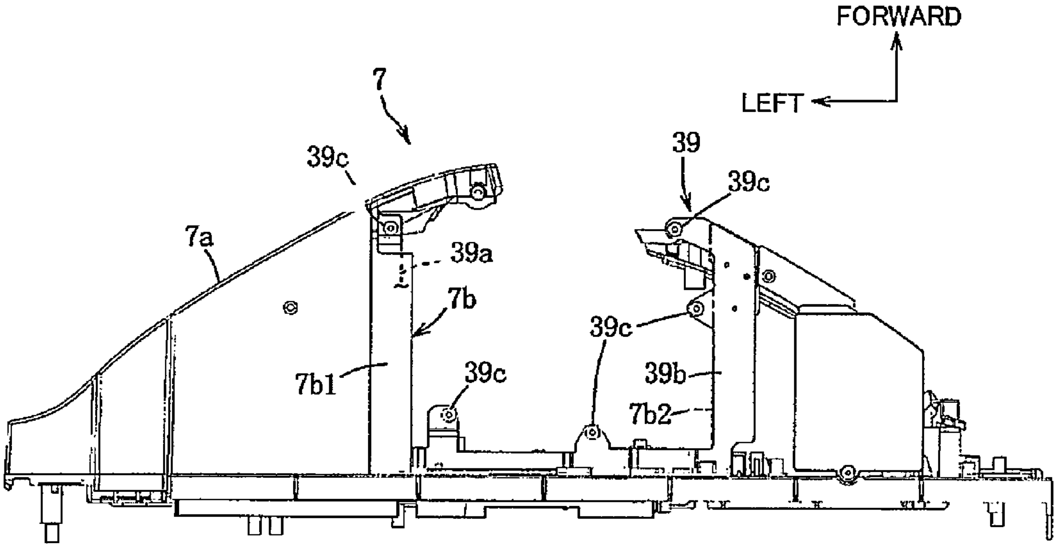
FIG. 11 is an exemplary bottom view showing part of the unit main body.

Next, the entertainment button device 9 will be explained. The entertainment button device 9 is configured to be able to move the entertainment button 40 over a predetermined normal operation position shown in FIG. 3; a pushed position shown in FIG. 4 in which the entertainment button 9 retracts from the normal operation position; and a protruding position shown in FIG. 5 in which the entertainment button 40 protrudes upward from the normal operation position. In addition, the entertainment button device 9 is configured to be able to push the entertainment button 40 from any position including the normal operation position (FIG. 3) and the protruding position (FIG. 5) to the pushed position (FIG. 4).

A large-sized entertainment button device 9 is provided, where the entertainment button 40 is several times as large as a general entertainment button and moves up and down in a stroke several times as long as a general entertainment button.

Here, the direction in which the entertainment button 40 moves over the normal operation position, the pushed position and the protruding position, is defined as the direction in which the entertainment button 40 moves up and down. One end to which the entertainment button 40 moves up is referred to as "front end" meanwhile the other end to which the entertainment button 40 moves down is referred to as "base end." Hereinafter, the direction in which the entertainment button 40 moves up and down is simply referred to as "moving direction." In addition, the direction in which the entertainment button 40 moves up is simply referred to as "moving-up direction", the direction in which the entertainment button 40 moves down is simply referred to as "moving-down direction", and the center of the axis of the entertainment button 40 (and a button case 50 and a shaft member 68 described later) is simply referred to as "central axis."

As shown in FIGS. 3 to 5 and 7, an ring-shaped convex portion 7*e* continuing to the respective upper ends of an outer peripheral wall 7*c*1 and an inner peripheral wall 7*c*2 of the button hole 7*c*. Here, when in a position in which the entertainment button 40 protrudes upward a little from the ring-shaped convex portion 7*e*, the entertainment button 40 is in the normal operation position (see FIG. 3). When in a position in which the entertainment button 40 moves down a little and enters the ring-shaped convex portion 7*e*, the entertainment button 40 is in the pushed position (see FIG. 4). When in a position in which the entertainment button 40 protrudes from the ring-shaped convex portion 7*e* with an amount several times (about seven to ten times) as much as the amount in the normal operation position, the entertainment button 40 is in the protruding position (see FIG. 5).

As shown in FIGS. 12 to 23, the entertainment button device 9 includes: the entertainment button 40; the button case 50 that accommodates the entertainment button 40 to allow the entertainment button 40 to move over the normal operation position, the pushed position and the protruding position; a pair of front and back biasing members 55 that biases the entertainment button 40 to the moving-up direction; and a button-up-and-down mechanism 60 that automatically moves the entertainment button 40 between the normal operation position and the protruding position. The button case 50 is placed on and attached to the discharge device 10 via a base 57.

As shown in FIGS. 12 to 15, the base 57 includes an upper base 58 and a lower base 59 made of synthetic resin. The upper base 58 has a cylindrical peripheral wall 58*a*, an upper wall 58*b* and a lower wall 58*c*. The upper wall 58*b* leans forward. The lower wall 58*c* includes a horizontal lower surface 58*c*1 and an inclined lower surface 58*c*2 which inclines forward. The lower base 59 has an upper wall 59*a* and a support leg 59*b*. The upper wall 59*a* includes a horizontal upper surface 59*a*1 and an inclined upper surface 59*a*2 which inclines forward. The support leg 59*b* is placed on and fixed to the discharge device 10.

The upper base 58 is fixed to the lower base 59 while the horizontal lower surface 58*c*1 and the inclined lower surface 58*c*2 of the upper base 58 are placed on the horizontal upper surface 59*a*1 and the inclined upper surface 59*a*2 of the lower base 59 through rubber cushion sheets 58*d*1 and 58*d*2, respectively. The peripheral wall 58*a* of the upper base 58 leans forward a little from the upright state. The main parts of the button-up-and-down mechanism 60 are mounted on the upper base 58.

As shown in FIGS. 12 to 16, the entertainment button 40 includes a button body 41 having an upper wall 41*a* and a peripheral wall 41*b* made of synthetic resin; a transparent button cover 42 that has an upper wall 42*a* and a peripheral wall 42*b* made of synthetic resin to cover the button body 41 and that can rotate around the central axis relative to the button body 41; and an annular member 43 (see FIGS. 17 to 21) attached to the lower end of the button body 41.

An outer flange part 42*c* formed on the lower end of the peripheral wall 42*b* of the button cover 42 is placed on an outer flange part 41*c* formed on the lower end of the peripheral wall 41*b* of the button body 41. In this state, the upper wall 41*a* of the button body 41 contacts (abuts on) the upper wall 42*a* of the button cover 42. The button cover 42 is supported by the button body 41 and moves up and down with the button body 41.

As shown in FIGS. 17 to 21, the annular member 43 includes: a fixed annular member 43*a* made of synthetic resin, which is fixed to the outer flange part 41*c* in the lower end of the button body 41; and a movable annular member 43*b* made of synthetic resin, which is provided below the fixed annular member 43*a* such that the movable annular member 43*b* can move up and down with respect to the fixed annular member 43*a* but cannot rotate around the central axis. The movable annular member 43*b* can move between the position in which the movable annular member 43*b* contacts the fixed annular member 43*a* and the position in which the movable annular member 43*b* is placed a little apart from the fixed annular member 43*a* in the moving-down direction.

The movable annular member 43*b* is biased in the moving-down direction in which the movable annular member 43*b* is placed apart from the fixed annular member 43*a* by a pair of left and right spring members 43*c* with a stronger biasing force than of the pair of biasing members 55. When the entertainment button 40 is in a position other than the pushed position, the movable annular member 43*b* is placed apart from the fixed annular member 43*a* in the moving-down direction.

As shown in FIGS. 12 to 16, the button case 50 has a cylindrical peripheral wall 50*a* and a bottom wall 50*b* made of synthetic resin, and the entertainment button 40 protrudes upward from the button case 50 (peripheral wall 50*a*). The bottom wall 50*b* is placed on and fixed to the upper wall 58*b* of the upper base 58 to lean forward while the peripheral wall 50*a* leans forward from its vertical state, and continues and extends from the peripheral wall 58*a* of the upper base 58.

The entertainment button 40 moves up and down in the direction in which the peripheral wall 50*a* of the button case 50 inclines, that is, the entertainment button 40 moves up and down while leaning forward in the moving-up direction from the upright state. The inner peripheral wall 702 of the button hole 7*c* formed in the unit main body 7*a* is fitted into the upper end of the peripheral wall 50*a* of the button case 50 from below, so that the entertainment button 40 protruding from the button case 50 moves into and out of the buttonhole 7*c*. An inner flange part 50*c* formed in the upper end of the peripheral wall 50*a* of the button case 50 is placed on the outer flange part 42*c* of the button cover 42 to prevent the button cover 42 from falling out in the moving-up direction.

The button case 50 has a plurality of (three) outlets 51 to 53 (openings 51 to 53) to discharge foreign matters such as liquid between the outer periphery (the peripheral wall 42*b* of the button cover 42) of the entertainment button 40 and the peripheral wall 50*a* of the button case 50, to the outside of the button case 50.

The plurality of outlets 51 to 53 are formed in the lower edge of the peripheral wall 50*a* of the button case 50 such that the outlets 51 to 53 are placed apart from each other in the circumference direction. The outlet 51 lying between the outlets 52 and 53 is formed in the lower edge of the front part of the peripheral wall 50*a* of the button case 50. This outlet 51 serves as a main opening to discharge foreign matters to the outside. Each of the outlets 51 to 53 has a rectangular shape. The lower edge of each outlet is formed by the outer periphery the bottom wall 50*b* of the button case 50.

For example, if the player spills beverage on the entertainment button 40 or over the vicinity of the entertainment button 40, the liquid as a foreign matter entering and flowing between the peripheral wall 42*b* of the button cover 42 and the peripheral wall 50*a* of the button case 50 is surely discharged directly from any of the plurality of outlets 51 to 53, or, after reaching the bottom wall 50*b* of the button case 50 once.

In addition, the outlets 51 to 53 also serve as a plurality of air inlets 51 to 53 for a sealed space which is enclosed by the entertainment button 40 and the button case 50 when the entertainment button 40 moves up and down. That is, when the entertainment button 40 moves up, the sealed space increases in volume, and therefore the plurality of air inlets 51 to 53 suck in the air from the outside. Meanwhile, when the entertainment button 40 moves down, the sealed space reduces in volume, and therefore the plurality of air inlets 51 to 53 discharge the air in the sealed space to the outside.

As shown in FIGS. 17 to 23, the button-up-and-down mechanism 60 includes: a button guide mechanism 61 that allows the entertainment button 40 to move up and down and that restricts the entertainment button 40 from rotating around the central axis; the pair of biasing members 55 that biases the entertainment button 40 in the moving-up direction; the shaft member 68 made of synthetic resin that extends in the moving direction of the entertainment button 40; a rotating mechanism 70 that rotates the shaft member 68; and an up-and-down operation mechanism 75 that moves the entertainment button 40 up and down in parallel with the shaft member 68 being rotated by the rotating mechanism 70.

The button guide mechanism 61 includes: a pair of front and back metal guide rods 62 extending in the moving direction; and a pair of front and back cylindrical parts into which the pair of guide rods 62 are fitted, respectively (not shown). The pair of cylindrical parts is formed integrally with the fixed annular part 43*a* of the entertainment button 40. The button guide mechanism 61 retains the posture of the entertainment button 40 and guides the entertainment button 40 to be able to move up and down but not to be able to rotate around the central axis.

While its base ends are fixed to the upper base 58, the pair of guide rods 62 extends from the upper base 58 in the moving-up direction, penetrates the bottom wall 50*b* of the button case 50, penetrates the movable annular member 43*b* and the fixed annular member 43*a* of the entertainment button 40 in the button case 50. Then, the pair of guide rods 62 is inserted into the entertainment button 40 from the base end side. A discoid stopper plate 63 made of synthetic resin is fixed to the upper ends of the pair of guide rods 62 in the entertainment button 40.

The entertainment button 40 is in the pushed position while the fixed annular member 43*a* contacts the movable annular member 43*b* and also the movable annular member 43*b* contacts the bottom wall 50*b* of the button case 50. On the other hand, the entertainment button 40 is in the protruding position while the fixed annular member 43*a* contacts the lower surface of the stopper plate 63, and therefore is stopped by the stopper plate 63. An LED board 64 is mounted on the upper surface of the stopper plate 63. A plurality of LEDs 65 are packaged on the upper surface of the LED board 64.

The button body 41 including the upper wall 41*a* and the peripheral wall 41*b* is formed as a light-transmissive lens part. When the LEDs 65 emit light, the light transmits through the button body 41 (lens part) to illuminate the button body 41. Here, a plurality of conducting wires that allow the plurality of LEDs 65 to emit light extend upward from the upper base 58 side and are connected to the LED board 64. A rectangular cylindrical wiring accommodating member 66 that accommodates and guides these conducting wires extend in the moving direction to connect between the upper base 58 and the stopper plate 63 while penetrating the fixed annular member 43*a* and the movable annular member 43*b* of the entertainment button 40.

Here, the button cover 42 is provided to be able to rotate relative to the button body 41. Therefore, even if the player rotates the button cover 42, only the button cover 42 runs idle but any external load is not applied to rotate the button body 41, so that it is possible to reliably prevent the button body 41 and the button guide mechanism 61 from being damaged due to an external load.

In addition, a rounded portion 42*d* having an arc cross-section is formed at the boundary between the upper wall 42*a* and the peripheral wall 42*b* of the button cover 42. As shown in FIG. 3, the rounded portion 42*d* is formed to prevent the peripheral wall 42*b* of the button cover 42 from going beyond the unit main body 7*a* (ring-shaped convex portion 7*a*) when the entertainment button 40 is in the normal operation position. Therefore, when the entertainment button 40 is in the normal operation position, it is difficult for the player to take up the upper outer peripheral part (rounded portion 42*d*) of the button cover 42. Accordingly, it is possible to more reliably prevent the button body 41 and the button guide mechanism 61 as well as the button cover 42 from being damaged.

The pair of biasing members 55 is formed by a pair of coil springs. The pair of coil springs is put around the pair of guide rods 62 respectively in the button case 50. Here, the pair of coil springs 55 is compressed and set between the movable annular member 43*b* of the entertainment button 40 and the upper wall 58*b* of the upper base 58 (or the bottom wall 50*b* of the button case 50).

The shaft member 68 is provided to align its central axis with the central axis of the entertainment button 40. While its base end is supported by the upper base 58 to be able to rotate, the shaft member 68 extends from the upper base 58 in the moving-up direction and penetrates the bottom wall 50*b* of the button case 50. Then, the shaft member 68 penetrates the movable annular member 43*b* and the fixed annular member 43*a* of the entertainment button 40 and is inserted into the entertainment button 40 from the base end side of the entertainment button 40 in the button case 50. That is, the entertainment button 40 is provided with the annular member 43 which is arranged outside of the outer periphery of the shaft member 68.

The rotating mechanism 70 includes an electric motor 71, a driving gear 72, an intermediate two-stage gear 73 and a driven gear 74. The electric motor 71 is attached to the upper base 58 to face the moving-up direction. The driving gear 72 is mounted on an output shaft 71*a* of the electric motor 71. The driving gear 72, the intermediate two-stage gear 73 and the driven gear 74 engage with each other. The intermediate two-stage gear 73 is rotatably supported by the upper base 58 while the driven gear 74 is fixed to the base end of the shaft member 68.

The up-and-down operation mechanism 75 includes a pair of left and right engagement parts 76 that moves with the entertainment button 40 and a pair of spiral guide parts 77 provided on the outer periphery of the shaft member 68. The pair of engagement parts 76 engages with the pair of spiral guide parts 77, respectively, while the entertainment button 40 is biased by the biasing members 55 to the moving-up direction. Then, the rotating member 70 rotates the shaft member 68, so that the pair of spiral guide parts 77 can move the pair of engagement parts 76 in the moving direction. The pair of engagement parts 76 and the pair of spiral guide parts are symmetric with respect to the central axis.

Each of the engagement parts 76 is formed by a pin member. The pin members are mounted to the movable annular member 43*b* and protrude from the inner periphery of the movable annular member 43*b* to the shaft member 68 (to the central axis) in the direction orthogonal to the central axis. By this means, the engagement parts 76 can engage with the spiral guide parts 77 (see FIG. 23).

Figure 22:
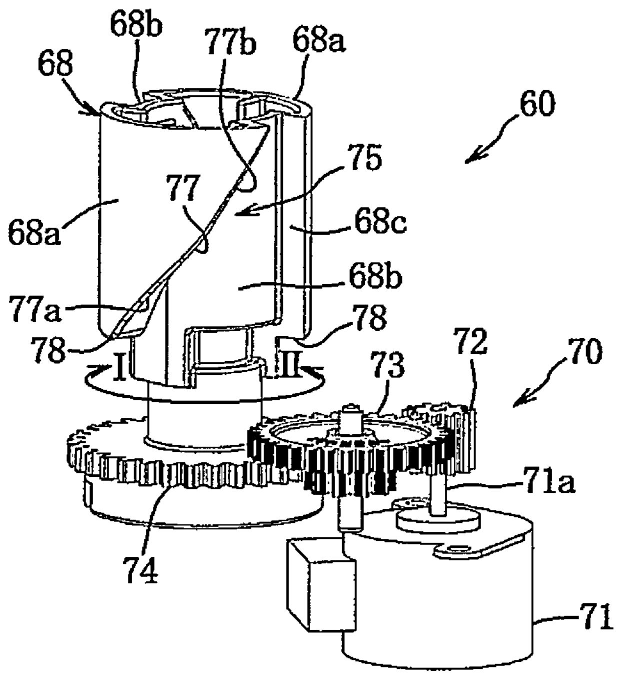
FIG. 22 is an exemplary perspective view showing a shaft member and a rotating mechanism.
Figure 23:
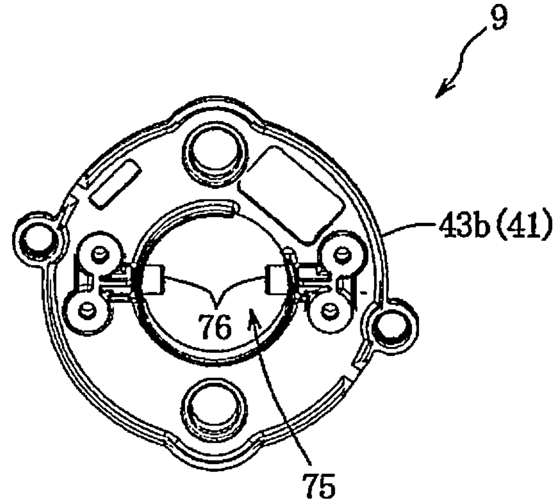
FIG. 23 is an exemplary plan view showing a movable annular member.

As shown in FIG. 22, each of the spiral guide parts 77 includes a first spiral guide portion 77*a* with a predetermined angle of inclination (about 45 degrees) and a second spiral guide portion 77*b*. The base end of the second spiral guide portion 77*b* continues to the front end of the first spiral guide portion 77*a*. The second spiral guide portion 77*b* has a greater angle of inclination (about 60 degrees) than of the first spiral guide portion 77*a*. The area in which the second spiral guide portion 77*b* is formed in the direction parallel to the central axis of the shaft member 68 is approximately the same or a little larger than the area in which the first spiral guide portion 77*a* is formed.

A pair of smoothing guide parts 78 are formed on the outer periphery of the shaft member 68, which continues to the base ends of the pair of spiral guide parts 77 (the first spiral guide portion 77*a*) and extends in parallel with the plane orthogonal to the central axis of the shaft member 68. The pair of the engagement parts 76 engages with the pair of the smoothing guide parts 78, respectively, to hold the entertainment button 40 in the normal operation position. The pair of smoothing guide parts 78 is also symmetric with respect to the central axis.

Here, a pair of convex portions 68*a* is formed symmetrically with respect to the central axis on the outer periphery of the shaft member 68. Meanwhile, a pair of concave portions 68*b* is formed between the pair of convex portions 68*a*, symmetrically with respect to the central axis. The surface of the pair of convex portions 68*a* forms part of a cylindrical surface around the central axis while the surface of the pair of convex portions 68*b* forms part of a cylindrical surface with a smaller diameter than of the surface of the convex portions 68*a*.

Each of the convex portions 68*a* has an inverted trapezoid shape. A spiral guide part 77 (including the first spiral guide portion 77*a* and the second spiral guide portion 77*b*) is formed in a step-like manner on one edge of the convex portion 68*a* in the circumference direction (the boundary with the concave portion 68*b*). Meanwhile a smoothing guide part 78 is formed on the base end of each convex portion 68*a* in a step-like manner. In addition, a straight step 68*c* extending in parallel with the direction of the central axis of the shaft member 68 is formed on the other edge of each convex portion 68*a* in the circumference direction (the boundary with the concave portion 68*b*).

When the entertainment button 40 is located between the normal operation position and the protruding position, and when the entertainment button 40 is located in the protruding position, each engagement part 76 provided in the entertainment button 40 is placed in the concave portion 68*b*. That is, each engagement part 76 is placed between the spiral guide part 77 of one convex portion 68*a* and the straight step 68*c* of the other convex portion 68*a*, and therefore can engage with the spiral guide part 77.

When the entertainment button 40 is not pushed, the pair of engagement parts 76 of the entertainment button 40 engages with the pair of smoothing guide part 78 of the shaft member 68 to hold the entertainment button 40 in the normal operation position. From this state, the pair of engagement parts 76 may be moved to be placed apart from the pair of smoothing guide parts 78 in the moving-down direction, and therefore it is possible to push the entertainment button 40 to the pushed position. After that, when the entertainment button 40 is released from being pushed, the entertainment button 40 returns to the normal operation position and is held in this position.

In addition, when the entertainment button 40 is not pushed, the shaft member 68 is rotated in the direction of arrow I shown in FIG. 22 from the above-described state in which the entertainment button 40 is held in the normal operation position, the pair of engagement parts 76 of the entertainment button 40 is released from the engagement with the pair of smoothing guide parts 78 of the shaft member 68 and moves to and engages with the pair of spiral guide parts 77 (the first spiral guide portion 77*a*). As a result, the entertainment button 40 starts moving up from the normal operation position.

The shaft member 68 is rotated while the pair of engagement parts 76 of the entertainment button 40 engages with the pair of spiral guide parts 77 of the shaft member 68, and therefore the pair of engagement parts 76 is moved in the moving direction, that is, the entertainment button 40 moves up and down. The shaft member 68 is rotated in the direction of arrow I shown in FIG. 22, and, finally, the entertainment button 40 moves up. As a result, the fixed annular member 43*a* of the entertainment button 40 is stopped by the stopper plate 63 fixed to the front ends of the pair of guide rods 62 to hold the entertainment button 40 is held in the protruding position.

Here, when the rotating speed of the shaft member 68 is fixed, the moving speed of the entertainment button 40 is slower in a first case in which the engagement part 76 engages with the first spiral guide portion 77*a* than in a second case in which the engagement part 76 engages with the second spiral guide portion 77*b*. That is, the load on the shaft member 68 to move the entertainment button 40 up and down is smaller in the first case than in the second case.

The pair of concave portions 68*b* allows the pair of engagement parts 76 to move to be placed apart from the pair of spiral guide parts 77 in the moving-down direction without collision with the pair of convex portions 68*a* while the entertainment button 40 is located in any position between the normal operation position and the protruding position. By this means, it is possible to push the entertainment button 40 to the pushed position. Also, from the state in which the entertainment button 40 is held in the protruding position, it is possible to push the entertainment button 40 to the pushed position.

After that, when the entertainment button 40 is released from being pushed, it returns to the position at which the push operation was started. To be more specific, when the entertainment button 40 moves up or down (the shaft member 68 rotates), the entertainment button 40 returns to a position near the position at which the push operation was started. Here, when the entertainment button 40 is pushed to the pushed position, the shaft member 68 is rotated to place the pair of smoothing guide parts 78 in the direction in which the pair of engagement parts 76 moves up. To be more specific, when the entertainment button 40 is pushed from the protruding position to the pushed position, the shaft member 68 is rotated a little in the direction of arrow I. As a result, when the entertainment button 40 is released from being pushed, the pair of engagement parts 76 engages with the pair of smoothing guide parts 78. Consequently, the entertainment button 40 returns to the normal operation position.

On the other hand, when the shaft member 68 is rotated in the direction of arrow II shown in FIG. 22 while the entertainment button 40 is not pushed and is held in the normal operation position as described above, the pair of engagement parts 76 of the entertainment button 40 is released from the engagement with the pair of smoothing guide parts 78 of the shaft member 68 to move in the moving-up direction along the pair of straight steps 68*c*. That is, the entertainment button 40 moves to the protruding position at a stretch.

As described above, the shaft member 68 is rotated in the direction of arrow I shown in FIG. 22 while the entertainment button 40 is held in the normal operation position, so that the pair of engagement parts 76 engages with the pair of spiral guide parts 77. As a result, it is possible to move the entertainment button 40 up to the protruding position at a speed according to the rotating speed of the shaft member 68 (for example, slowly). On the other hand, the shaft member 68 is rotated in the direction of arrow II shown in FIG. 22 while the entertainment button 40 is held in the normal operation position, so that the pair of concave portions 68*b* prevents the pair of engagement parts 76 from engaging with the pair of convex portions 68*a*. Therefore, it is possible to move the entertainment button 40 up to the protruding position at a high speed without engagement between the pair of the engagement parts 76 and the pair of spiral guide parts 77. That is, when the button-up-and-down mechanism 60 moves the entertainment button 40 from the normal operation position to the protruding position, the speed at which the entertainment button 40 moves up changes depending on the direction in which the rotating mechanism 70 rotates the shaft member 68.

Next, the discharge device 10 will be explained. As shown in FIG. 6, FIG. 12, FIG. 13, and FIG. 24 to FIG. 26, the discharge device 10 includes: a case member 80 made of synthetic resin; a discharge passage 81 formed in the case member 80; an opening and closing plate 82 made of synthetic resin that can open and close the discharge passage 81; an opening and closing mechanism 83 that allows the opening and closing plate 82 to open and close; an open retention mechanism 84 that can releasably keep the opening and closing plate 82 in the position in which the opening and closing plate 82 is open the discharge passage 81; and a closed lock mechanism 85 that releasably locks the opening and closing plate 82 in the position in which the opening and closing plate 82 closes the discharge passage 81 to prevent the opening and closing plate 82 from being touched directly to open the opening and closing plate 82.

The case member 80 has a rectangular shape in a plan view and has a predetermined thickness in the vertical direction. The opening and closing mechanism 83 is accommodated and mounted in the case member 80. This case member 80 is set from below in the lower end part of the device accommodating hole 7*d* formed in the unit main body 7*a* of the tray unit 7*a*. The outer peripheral part of the case member 80 is mounted to the reinforcing metal plate 39 attached to the unit main body 7*a*, with a plurality of bolts (not shown). A pedestal 80*a* is formed on the upper surface of the case member 80. The support leg 59*b* of the lower base 59 is fixedly placed on the pedestal 80*a*.

The discharge passage 81 is formed in the front part of the case member 80 in the left side. A ball introducing inlet 81*a* that opens into the left side to face the inside of the lower tray 8*b* is formed in the upstream of the discharge passage 81. A ball outlet 81*b* is formed in the downstream of the discharge passage 81*b*. This ball outlet 81*b* opens downward to face the outside and is formed on the right side of the ball introducing inlet 81*a*. The opening and closing plate 82 is supported to be able to slide right and left in the case member 80, and therefore can open and close the ball outlet 81*b*.

Figure 24:
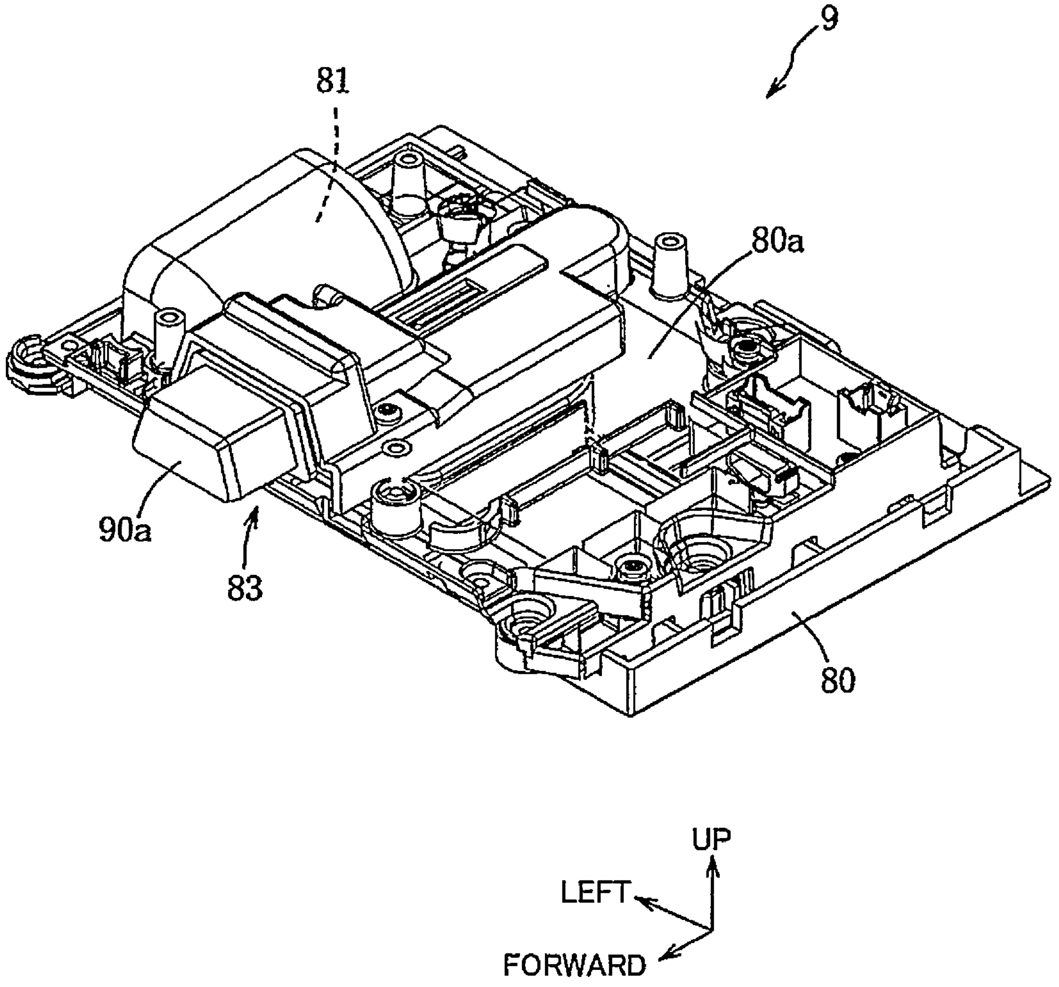
FIG. 24 is an exemplary perspective view showing a discharge device.
Figure 25:
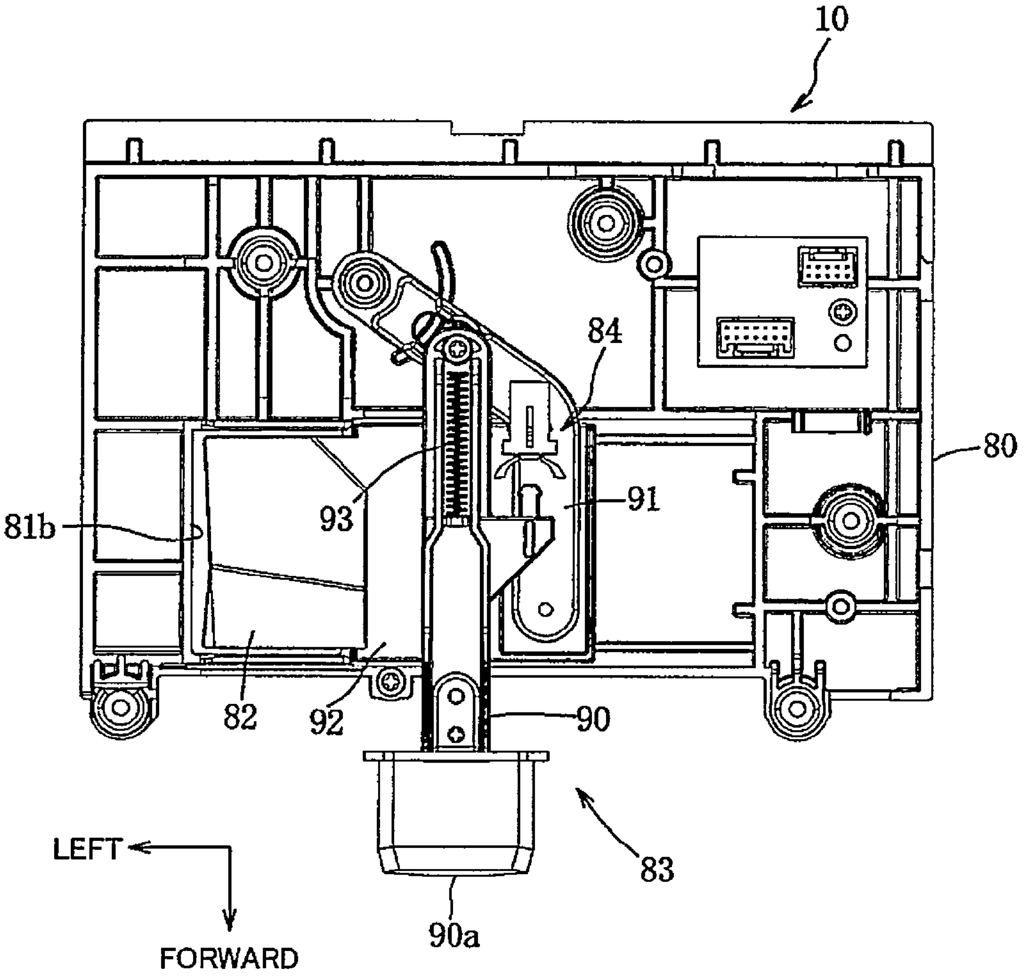
FIG. 25 is an exemplary plan view showing the discharge device.

The opening and closing mechanism 83 includes: an operating member 90 supported in the case member 80 to be able to move forward and backward and also to be able to be locked in the forward movement retention position shown in FIG. 24; an arm member 91 supported in the case member 80 to be able to rotate about the vertical central axis; an operated member 92 formed integrally with the opening and closing plate 82 on the right side; a first spring 93 that biases the operating member 90 forward; and a second spring 94 that biases the opening and closing plate 82 (the operated member 92) to the left hand (closed position). Here, all the operating member 90, the arm member 91 and the operated member 92 are made of synthetic resin.

The operating member 90 is placed above the arm member 91 and the operated member 92 (the opening and closing plate 82). An operating portion 90*a* is provided in the front end of the operating part 90 to protrude forward from the case member 80 so that the player can operate the operating portion 90*a*. The arm member 91 is formed in a wedge shape in a plan view. The rear end part of the arm member 91 is rotatably supported in the case member 80.

A first engagement pin 90*b* provided at the rear end of the operating member 90 to protrude downward is movably fitted into a first elongate hole 91*a* formed in the length direction of the back part of the arm member 91. A second engagement pin 91*b* provided at the front end of the arm member 91 to protrude downward is movably fitted into a second elongate hole 92*a* formed in the operated member 92 in the longitudinal direction. In this way, the operating member 90, the arm member 91 and the operated member 92 are coupled to each other to operate together.

When the operating member 90 is pushed backward from the forward movement retention position, the pushing force allows the arm member 91 to rotate counterclockwise in a plan view, so that the opening and closing plate 82 is slid to the right hand (open position) with the operated member 92. After that, when released from being pushed, the operating member 90 returns to the forward movement retention position while the open retention mechanism 84 does not hold the opening and closing plate 82 in the open position. Meanwhile, the second spring 94 allows the opening and closing plate 82 to slide to the left hand (closed position) with the operated member 92 to rotate the arm member 91 clockwise in a plane view.

The open retention mechanism 84 includes a held portion 90*c* provided in the operating member 90 to protrude backward, and a holding mechanism part 96 mounted in the case member 80 to be able to hold the held portion 90*c*. When the operating member 90 is pushed up to the backward movement limit position, the held portion 90*c* switches the holding mechanism part 96 from a non-active state to an active state. Next, when the operating member 90 is released from being pushed, the held portion 90*c* is held by the holding mechanism part 96 in an active state, so that the operating member 90 is held in an operation retention position a little before the backward movement limit position and the opening and closing plate 82 is held in the open position.

After that, when the operating member 90 is pushed from the operation retention position to the backward movement limit position again, the held portion 90*c* switches the holding mechanism part 96 from the active state to the non-active state. Next, when the operating member 90 is released from being pushed, the operating member 90 moves forward to the forward movement retention position, so that the opening and closing plate 82 is closed in the closed position.

Figure 26:
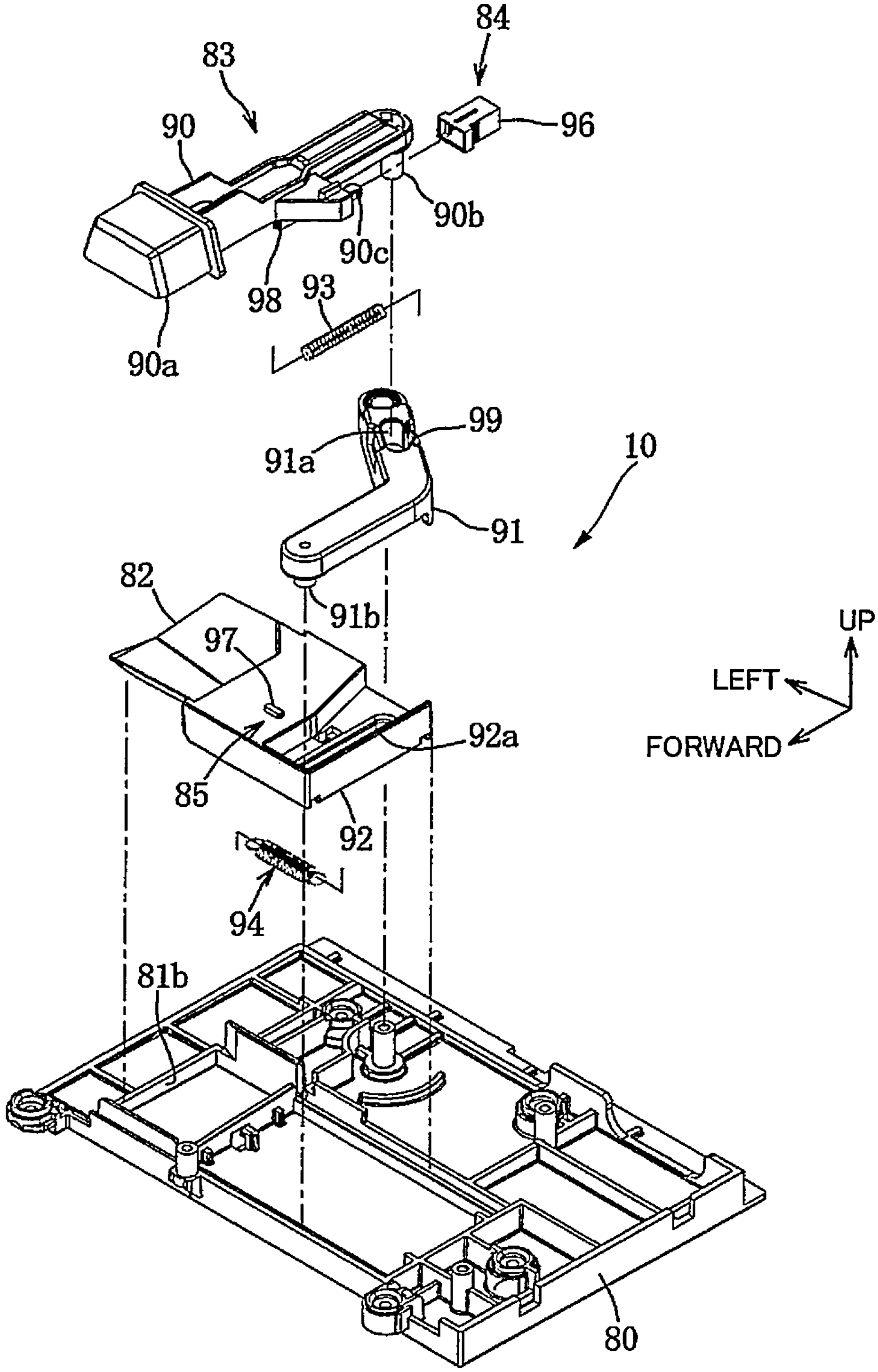
FIG. 26 is an exemplary exploded perspective view showing the discharge device without part of a case member.

The closed lock mechanism 85 includes a first engagement piece 97 provided in the operated member 92 to protrude upward; a second engagement piece 98 provided in the operating member 90 to protrude downward; and a pin escapement concave part 99 which is formed as a cutout and provided in the first elongate hole 91*a* of the arm member 91 (see FIG. 26).

When the operating member 90 is in the forward movement retention position and the opening and closing plate 82 is in the closed position, the first engagement piece 97 is positioned on the left side of the second engagement piece 98 to approach and face the second engagement piece 98. Therefore, even if the player touches the opening and closing plate 82 with one hand to take out playing balls from the lower tray 8 with the hand so that a force is applied to open the opening and closing plate 82, the first engagement piece 97 engages with the second engagement pieces 98. At this time, if there is no force to push the operating member 90 backward, the opening and closing plate 82 is locked in the closed position.

Meanwhile, if the operating member 90 is pushed backward while the operating member 90 is in the forward movement retention position and the opening and closing plate 82 is in the closed position, the first engagement pin 90*b* of the operating member 90 is inserted into the pin escapement concave part 99 of the arm member 91 while the operating member 90 moves back a little. As a result, the driving force is not transmitted from the operating member 90 to the arm member 91, so that the arm member 91 is not rotated, and therefore the opening and closing plate 82 is not slid to the right side but is held in the closed position.

In this period of time, the second engagement piece 98 of the operating member 90 moves backward from the right side of the first engagement piece 97 of the operated member 92. After that, if the operating member 90 continues to be pushed backward, the driving force is transmitted from the operating member 90 to the arm member 91, so that the arm member 91 is rotated. As a result, the opening and closing plate 82 is slid to the right hand without engagement between the first engagement piece 97 and the second engagement piece 98. Here, in a case in which the opening and closing plate 82 is slid leftward from the open position to the closed position, the operating member 90 reaches the forward movement retention position after the opening and closing plate 82 reaches the open position. Therefore, the second engagement piece 98 moves to the right side of the first engagement piece 97 without collision with the first engagement piece 97.

The pachinko game machine 1 described above can produce the following effects. The tray unit 7 is provided with the entertainment button device 9 having the entertainment button 40 that the player can push, and the discharge device 10 provided below the entertainment button device 9 to discharge the playing balls accumulated in the lower tray 8*b* to the outside. The entertainment button device 9 is configured to allow the entertainment button 40 to be pushed from the upper side of the tray unit 7 and is placed on and supported by the discharge device 10.

The discharge device 10 is set in the unit main body 7*a* of the tray unit 7, and the entertainment button device 9 is placed on and supported by the discharge device 10. By this means, the unit main body 7*a* can accept the load (impact load) applied from the entertainment button 40 being pushed, from the entertainment button device 9 through the discharge device 10. Therefore, it is possible to omit a separate structure to firmly mount the entertainment button device 9 to the unit main body 7*a*, and consequently simplify the mounting structure for the entertainment button device 9 and the discharge device 10 in whole.

A large-sized entertainment button device 9 is provided with the large-sized entertainment button 40 moving up and down in a long stroke. The entertainment button device 9 is placed to approach the discharge device 10 below the entertainment button device 9. With this arrangement, the entertainment button device 9 can be placed on and supported by the discharge device 10. The arrangement and the mounting structure of the entertainment button device 9 and the discharge device 10 is appropriate for the large-sized entertainment button device 9.

The discharge device 10 is fixed to the lower part of the unit main body 7*a* of the tray unit 7 via the reinforcing metal plate 39. By this means, it is possible to improve the strength of the mounting structure of the discharge device 10. Moreover, the plate pieces 39*a* and 39*b* of the reinforcing metal plate 39 are placed on and attached to the surface of the plate supporting portions 7*b*1 and 7*b*2 formed in the lower part of the unit main body 7*a*. The discharge device 10 is attached to the reinforcing metal plate 39. Therefore, it is possible to disperse the load applied to the reinforcing metal plate 39, which is generated at the time the entertainment button 40 is pushed, and apply the load to the unit main body 7*a*.

Particularly, the entertainment button 40 of the entertainment button device 9 is large, and therefore the impact load generated at the time the entertainment button 40 is pushed is large. Moreover, the stroke of the entertainment button 40 being pushed from the protruding position to the pushed position is long, so that the impact load generated in the period of time for the stroke is likely to increase. However, with the mounting structure of the discharge device 10, it is possible to reliably prevent the mounting structure itself and the unit main body 7*a* from being damaging.

It is possible to easily mount the entertainment button device 9 and the discharge device 10 to the tray unit 7 by the following steps: coupling the entertainment button device 9 and the discharge device 10 to integrate them; inserting the integrated entertainment button device 9 and discharge device 10 into the device accommodating hole 7*d* of the unit main body 7*a* of the tray unit 7 from underneath; and mounting the discharge device 10 to the unit main body 7*a*. That is, it is possible to reduce the burden of installation of the entertainment button device 9 and the discharge device 10.

The entertainment button device 9 has the button case 50 including the peripheral wall 50*a* and the bottom wall 50*b* that accommodate the entertainment button 40 to be able to move up and down. The button case 50 includes a plurality of (three) outlets 51 to 53 that discharge foreign matters between the outer periphery of the entertainment button 40 and the peripheral wall 50*a* of the button case 50, to the outside of the button case 50.

By this means, it is possible to protect the entertainment button 40 by accommodating the entertainment button 40 to be able to move up and down in the button case 50. In addition, if the player spills beverage on the entertainment button 40 or over the vicinity of the entertainment button 40, and the liquid as a foreign matter enters and flows between the outer periphery of the entertainment button 40 and the peripheral wall 50*a* of the button case 50, the foreign matter is discharged from any of the plurality of outlets 51 to 53 of the button case 50. By this means, the entertainment button 40 can normally move up and down without the interference from the foreign matter.

A plurality of outlets 51 to 53 also serve as air inlets for the space enclosed by the entertainment button 40 and the button case 50 when the entertainment button 40 moves up and down. Therefore, with the plurality of outlets 51 to 53, it is possible to produce an effect of discharging the foreign matter between the outer periphery of the entertainment button 40 and the peripheral wall 50*a* of the button case 50 to the outside of the button case, as described above. Moreover, since the plurality of the outlets 51 to 53 also serve as the air inlets, it is possible to smoothly move the entertainment button 40 up and down. Particularly, thanks to the long stroke of the entertainment button 40, it is possible to produce a great effect of smoothly moving the entertainment button 40 up and down.

The bottom wall 50*b* of the button case 50 is provided to lean forward. The plurality of outlets 51 to 53 are formed in the lower edge of the peripheral wall 50*a* of the button case 50. The central outlet 51 is formed in the lower edge of the front part of the peripheral wall 50*a* of the button case 50. Therefore, the liquid as a foreign matter entering and flowing between the peripheral wall 42*b* of the button cover 42 and the peripheral wall 50*a* of the button case 50 is surely discharged from any of the plurality of outlets 51 to 53 directly, or, after reaching the bottom wall 50*b* of the button case 50 once.

The plurality of outlets 51 to 53 are formed apart from each other in the circumference direction in the lower edge of the peripheral wall 50*a* of the button case 50. Therefore, it is possible to ensure the coupling (connection) between the peripheral wall 50*a* and the bottom wall 50*b* of the button case 50, that is, the button case 50 is robustly constructed, and then it is possible to form the plurality of outlets 51 to 53 in the button case 50.

The button-up-and-down mechanism 60 includes: the button guide mechanism 61 that allows the entertainment button 40 to move up and down and that restricts the entertainment button 40 from rotating; the pair of biasing members 55 that biases the entertainment button 40 in the moving-up direction; the shaft member 68 that extends in the moving direction of the entertainment button 40; the rotating mechanism 70 that rotates the shaft member 68; the pair of engagement parts 76 provided in the entertainment button 40; and the pair of spiral guide parts 77 provided in the outer periphery of the shaft member 68. The pair of engagement parts 76 engages with the pair of spiral guide parts 77, respectively, while the entertainment button 40 is biased by the pair of biasing members 55, and the shaft member 68 is rotated by the rotating mechanism 70 so that the pair of spiral guide parts 77 moves the pair of engagement part 76 in the moving-down direction.

In this way, the rotating mechanism 70 rotates the shaft member 68, and therefore it is possible to smoothly move the entertainment button 40 up and down; allow the entertainment button 40 to desirably move up and down (stop temporarily, and move up and down repeatedly); and freely change the speed at which the entertainment button 40 moves up and down. As a result, it is possible to improve the effect of the entertainment of the game with the up-and-down movement of the entertainment button 40. Particularly, a large-sized entertainment button device 9 can be provided with the large-sized entertainment button 40 moving up and down in a long stroke.

The button-up-and-down mechanism 60 moves the entertainment button 40 between a predetermined normal operation position and the protruding position in which the entertainment button 40 protrudes upward from the normal operation position. The button-up-and-down mechanism 60 allows the entertainment button 40 to be pushed from any position including the normal operation position and the protruding position to the pushed position in which the entertainment button 40 retracts from the normal operation position.

That is, the button-up-and-down mechanism 60 can be configured not to interfere with the entertainment button 40 being pushed to the pushed position whenever the player pushes the entertainment button 40, for example, when the entertainment button 40 is held in the normal operation position or the protruding position, or when the entertainment button 40 is moved up and down by the button-up-and-down mechanism 60. Therefore, it is possible to ensure the degree of freedom of the entertainment button 40 being operated, and therefore improve operability.

The shaft member 68 is configured to be inserted into the entertainment button 40 from the base end side of the entertainment button 40. Therefore, the shaft member 68 can be provided in the entertainment button 40 not to be exposed to the outside. In addition, the entertainment button 40 is provided with the movable annular member 43*b* placed outside the outer periphery of the shaft member 68, and the pair of engagement parts 76 protrudes from the inner periphery of the movable annular member 43*b* to the shaft member 68 side to be able to engage with the pair of spiral guide parts 77. Accordingly, it is possible to reliably engage the pair of engagement parts 76 with the pair of spiral guide parts 77 to steadily move the entertainment button 40 up and down.

Each spiral guide part 77 includes the first spiral guide portion 77*a* and the second spiral guide portion 77*b*. The second spiral guide portion 77*b* continues to the front end of the first spiral guide portion 77*a* and has a greater angle of inclination than of the first spiral guide portion 77*b*. Therefore, when the rotating speed of the shaft member 68 is fixed, the speed at which the entertainment button 40 moves up and down is slower in a first case in which the pair of engagement parts 76 engages with the pair of first spiral guide portions 77*a* than in a second case in which the pair of engagement parts 76 engages with the pair of second spiral guide portions 77*b*. That is, the load on the shaft member 68 to move the entertainment button 40 up and down is smaller in the first case than in the second case.

In addition, the rotating mechanism 70 rotate and move the shaft member 68 up and down while the load on the shaft member 68 to move the entertainment button 40 up and down is reduced, that is, the pair of engagement parts 76 engages the pair of the first spiral guide portions 77*a*. By this means, it is possible to allow the entertainment button 40 to repeatedly move up and down smoothly. It is preferable to move the entertainment button 40 up and down in a position in which the entertainment button 40 moves up a little from the normal operation position. By this means, it is possible to perform an entertainment to excite the player about whether or not the entertainment button 40 moves to the protruding position.

The pair of smoothing guide parts 78 is formed on the outer periphery of the shaft member 68. The pair of smoothing guide parts 78 continues to the base ends of the pair of spiral guide parts 77 and extends in parallel with the plane orthogonal to the central axis of the shaft member 78. The pair of engagement parts 76 engages with the pair of smoothing guide parts 78 to hold the entertainment button 40 in the normal operation position. Accordingly, it is possible to reliably hold the entertainment button 40 in the normal operation position. In addition, when the button-up-and-down mechanism 60 moves the entertainment button 40 down, the pair of engagement parts 76 is smoothly moved from the pair of spiral parts 77 to the pair of smoothing parts 78, and therefore it is possible to smoothly move the entertainment button 40 down to the normal operation position.

With the pair of engagement parts 76 and the pair of spiral guide parts 77, the button-up-and-down mechanism 60 can more smoothly and stably move the entertainment button 40. Here, although an arrangement has been described where one pair of engagement parts 76 and one pair of spiral guide parts 77 are provided, three or more pairs are possible.

The present invention can be practiced with various configurations in addition to in the above-described embodiment as long as they do not deviate from the gist of the present invention. The entertainment button device and the discharge device according to the present invention, or the tray unit provided with them, are applicable to various pachinko game machines. In particular, the entertainment button device is applicable to various game machines such as a slot machine besides pachinko game machines.

<Variations>

Figure 27:
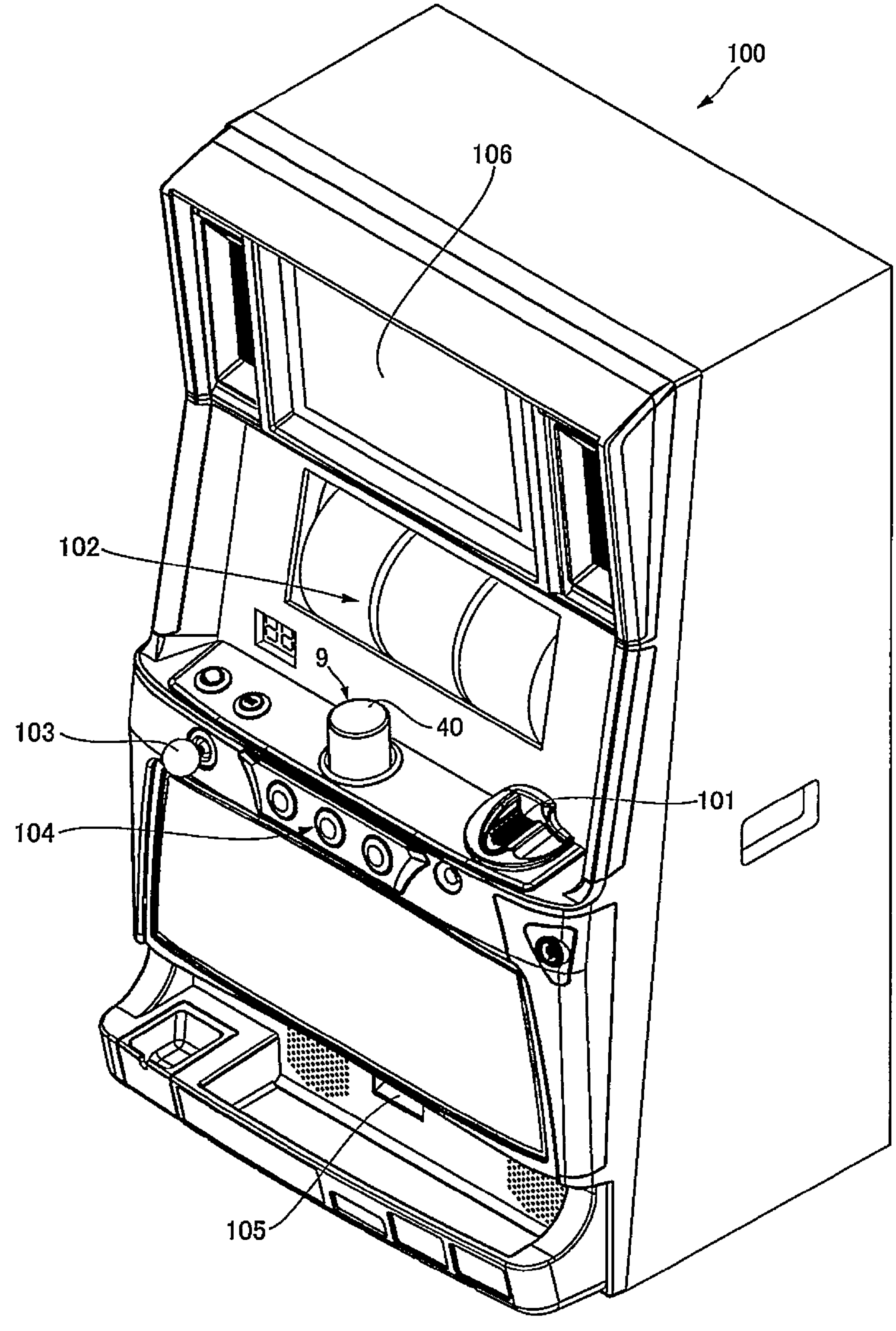
FIG. 27 is an exemplary perspective view showing a slot machine according to a variation.

FIG. 27 is a variation showing a slot machine 100 including the entertainment button device 9 according to the present invention.

As shown in FIG. 27, the slot machine 100 at least includes: the entertainment button device 9 having the entertainment button 40; a coin slot 101 to insert medals, coins and so forth; a plurality of reels 102 on which several kinds of symbols are shown; a control lever 103 to rotate the reels 102; stop buttons 104 corresponding to the respective reels 102 to stop the reels 102; a payout slot 105 to pay out medals, coins and so forth; and an image display device 106 that displays images associated with entertainments.

The player puts medals, coins and so forth in the coin slot 101 and operates the control lever 103 to start rotating the reels 102. Then, the player operates a stop button 104, the reel 102 corresponding to the operated stop button 104 stops.

If a specific symbol is shown or specific symbols are shown at the time all the reels 102 stop, a predetermined number of medals or coins are paid out from the payout slot 105.

Then, the images associated with the entertainment are shown on the image display device 106 until all the reels 102 stop after the reels 102 start rotating. Moreover, the entertainment button 40 moves up and down between a predetermined operation position and the protruding position provided that a predetermined event occurs. By this means, it is possible to improve the effect of the entertainment of the game.

Here the slot machine 100 shown in FIG. 27 has a configuration where the stop buttons 104 are provided to stop the reels 102 and the reels 102 are stopped by operating the stop buttons 104. However, another configuration is possible where the stop buttons 104 are omitted and the reels 102 automatically stop.

In addition, with the slot machine 100 shown in FIG. 27, the reels 102 may be replaced with an image display device such as a liquid crystal display device, organic electroluminescence panel and so forth.

Figure 28:
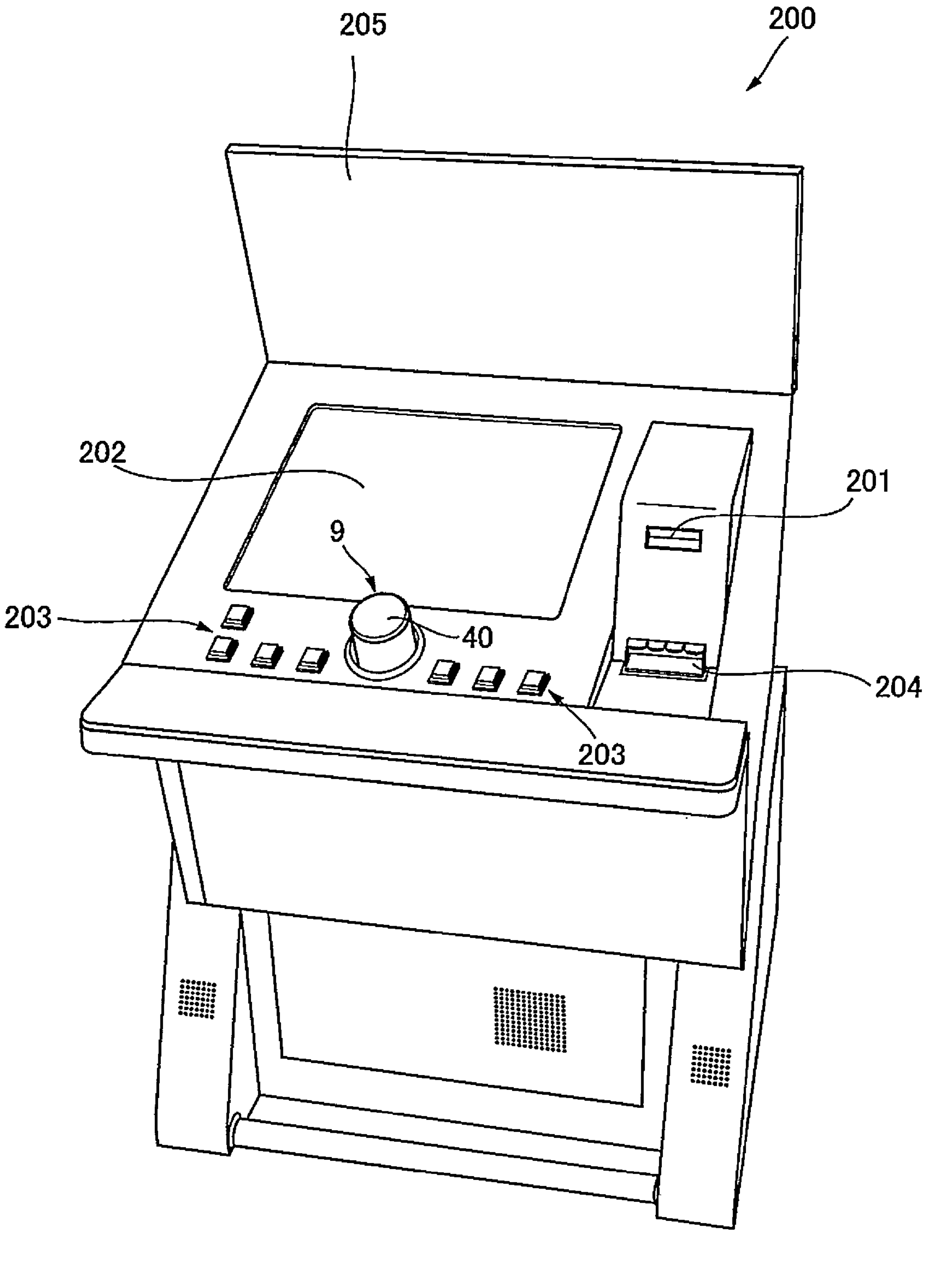
FIG. 28 is an exemplary perspective view showing a table game machine according to another variation.

FIG. 28 is a variation showing a table game machine 200 including the entertainment button device 9 according to the present invention.

As shown in FIG. 28, the table game machine 200 at least includes: the entertainment button device 9 having the entertainment button 40; a card slot 201 to insert cards, bills and so forth; an image display device 202 to perform card games such as poker, baccarat and so forth, or games on such as a slot machine; control buttons 203 to control various operations such as start, selection, end of a game and so forth; and a display panel 205 to inform the contents of games.

The player inserts bills and so forth into the card slot 201 and then plays a game performed on the image display device 202, operating the control buttons 203. Then, a predetermined number of cards, bills and so forth are paid out from the payout slit 204 based on the result of the game.

While the player plays a game with this table game machine 200, the entertainment button 40 is moved up and down between a predetermined normal operation position and the protruding position provided that a predetermined event occurs. By this means, it is possible to improve the effect of the entertainment of the game.

What is claimed is:

1. An entertainment button device comprising:

an entertainment button that a player can push; and a button-up-and-down mechanism configured to move the entertainment button up and down from a predetermined normal operation position to a protruding position in which the entertainment button protrudes upward from the normal operation position, the button-up-and-down mechanism including:

a bias member configured to bias the entertainment button in a moving-up direction;

a shaft member extending from the normal position to the protruding position of the entertainment button;

a rotating mechanism configured to rotate the shaft member;

an engagement part configured to move up and down together with the entertainment button; and a spiral guide part formed on an outer periphery of the shaft member in a spiral manner, wherein the engagement part engages with the spiral guide part, wherein the rotating mechanism rotates the shaft member, and therefore the spiral guide part moves the engagement part in a moving direction, so that the entertainment button moves up and down between the predetermined normal operation position to the protruding position, and wherein the spiral guide part includes a first spiral guide portion and a second spiral guide portion, wherein the second spiral guide portion continues to a front end of the first spiral guide portion and has a greater angle of inclination than of the first spiral guide portion.

2. The entertainment button device according to claim 1, wherein:

the shaft member is provided inside the entertainment button;

an annular member is provided in the entertainment button and located outside the outer periphery of the shaft member; and the engagement part is provided on an inner periphery of the annular member to protrude to the shaft member, wherein the engagement part can engage with the spiral guide part.

3. The entertainment button device according to claim 1, further comprising a smoothing guide part continuing to a base end of the spiral guide part and extending in parallel with a plane orthogonal to a central axis of the shaft member, wherein the engagement part engages with the smoothing guide part to hold the entertainment button in the normal operation position.

4. The entertainment button device according to claim 1, further comprising a smoothing guide part continuing to a base end of the spiral guide part and extending in parallel with a plane orthogonal to a central axis of the shaft member, wherein the engagement part engages with the smoothing guide part to hold the entertainment button in the normal operation position.

5. A game machine having the entertainment button device according to claim 1.

* * * * *